US007866686B2

(12) United States Patent
Conaway et al.

(10) Patent No.: US 7,866,686 B2
(45) Date of Patent: Jan. 11, 2011

(54) COLLAPSIBLE WHEELBARROW

(75) Inventors: Brian J. Conaway, Columbus, OH (US); Keith Kristiansen, Stratford, CT (US); David Demar, Tenafly, NJ (US); Mark Millman, Key Port, NJ (US)

(73) Assignee: Ames True Temper, Inc., Camp Hill, PA (US)

( * ) Notice: Subject to any disclaimer, the term of this patent is extended or adjusted under 35 U.S.C. 154(b) by 1171 days.

(21) Appl. No.: 10/805,685

(22) Filed: Mar. 19, 2004

(65) Prior Publication Data
US 2005/0104334 A1 May 19, 2005

Related U.S. Application Data

(60) Provisional application No. 60/523,066, filed on Nov. 18, 2003.

(51) Int. Cl.
B62B 1/00 (2006.01)
(52) U.S. Cl. .................... 280/653; 280/47.31
(58) Field of Classification Search ......... 280/653–655, 280/659, 47.18, 47.19, 47.26, 47.31, 47.34, 280/47.35
See application file for complete search history.

(56) References Cited

U.S. PATENT DOCUMENTS

| | | | | |
|---|---|---|---|---|
| 676,163 A * | 6/1901 | Victor | | 280/47.18 |
| 705,406 A * | 7/1902 | House et al. | | 414/450 |
| 944,291 A | 12/1909 | Spangler | | |
| 1,560,802 A * | 11/1925 | Julstedt | | 280/38 |
| 2,422,331 A | 3/1946 | Bates | | |
| 2,471,462 A | 5/1946 | Toth | | |
| 2,494,199 A | 3/1947 | Provitola | | |
| 2,629,608 A | 2/1953 | Jones | | |
| 2,660,446 A * | 11/1953 | Edhardt | | 280/653 |
| 2,672,348 A * | 3/1954 | Scott | | 280/653 |
| 2,800,335 A | 7/1957 | Clapp | | |
| 3,404,427 A | 10/1968 | Mack | | |
| 3,552,760 A | 1/1971 | Sine | | |
| 3,722,904 A | 3/1973 | Puckett | | |
| 3,743,312 A * | 7/1973 | Gibbons | | 280/47.18 |
| 3,888,501 A | 6/1975 | McChesney | | |
| 4,109,933 A | 8/1978 | O'Brian | | |
| 4,401,313 A | 8/1983 | Filas | | |
| 4,471,996 A | 9/1984 | Primeau | | |
| 4,781,396 A | 11/1988 | King | | |

(Continued)

*Primary Examiner*—J. Allen Shriver, II
*Assistant Examiner*—Bridget Avery
(74) *Attorney, Agent, or Firm*—Eckert Seamans Cherin & Mellott, LLC; David C. Jenkins, Esquire

(57) ABSTRACT

A collapsible wheelbarrow includes a rigid front bracket, a wheel rotatably secured to the front bracket, and first and second handle arms pivotably attached to the front bracket. The first and second handle arms are laterally pivotable about first and second pivot axes respectively. The first and second pivot axes are each spaced apart from the axis of rotation of the wheel. Preferably a clamping device removably applies a clamping force between the first and second handle arms and clamps a rigid tray between the first and second handle arms. The tray is preferably interconnected with the first and second handle arms to permit relative movement in a lateral direction and to prevent relative movement in a forward rearward direction. Preferably, the front bracket has spaced apart upper and lower walls and the first and second handle arms extend between the upper and lower walls.

26 Claims, 13 Drawing Sheets

U.S. PATENT DOCUMENTS

| | | |
|---|---|---|
| 4,789,171 A | 12/1988 | Porter |
| 4,951,956 A | 8/1990 | Vittone |
| 5,026,079 A * | 6/1991 | Donze et al. ............. 280/47.31 |
| 5,153,966 A | 10/1992 | Godwin |
| 5,222,757 A | 6/1993 | Magyar |
| D337,192 S | 7/1993 | Magyar |
| 5,372,376 A | 12/1994 | Pharaoh |
| 5,433,462 A | 7/1995 | Groleau |
| D362,100 S | 9/1995 | McMurdo |
| D373,878 S | 9/1996 | Van Der Storm |
| 5,601,298 A | 2/1997 | Watanabe |
| 5,607,174 A | 3/1997 | Ambrogio |
| D393,514 S | 4/1998 | Hadley |
| 5,794,307 A | 8/1998 | Overcash |
| 5,806,878 A | 9/1998 | Mroczka |
| 5,810,375 A | 9/1998 | Hoffarth |
| 5,908,202 A | 6/1999 | Leger |
| 5,915,706 A | 6/1999 | Mosley |
| 6,017,053 A | 1/2000 | Leger |
| 6,099,025 A | 8/2000 | Rohrs |
| 6,125,512 A | 10/2000 | Weber |
| 6,161,850 A * | 12/2000 | James et al. ............. 280/47.18 |
| 6,186,523 B1 * | 2/2001 | Aielli ...................... 280/47.31 |
| 6,328,331 B1 | 12/2001 | McEnteggart |
| 6,336,254 B1 | 1/2002 | Graff |
| 6,550,104 B2 | 4/2003 | Cacciacarne |
| 6,764,093 B2 * | 7/2004 | Allsop et al. ................ 280/653 |
| 2002/0113388 A1 | 8/2002 | Robinson |
| 2002/0195783 A1 | 12/2002 | Robinson |
| 2003/0034620 A1 | 2/2003 | Allsop |

* cited by examiner

COLLAPSIBLE WHEELBARROW

CROSS-REFERENCE TO RELATED APPLICATIONS

This application claims the priority benefit of U.S. Provisional Patent application No. 60/523,066 filed on Nov. 18, 2003, the disclosure of which is expressly incorporated herein in its entirety by reference.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to wheelbarrows and, more particularly, to wheelbarrows which can be collapsed or folded for shipping and storage.

BACKGROUND OF THE INVENTION

Wheelbarrows have long been used to move heavy or bulky items by human propulsion. Conventional wheelbarrows have a wheel rotatably mounted to a rigid frame. The frame typically includes a pair of parallel handles for grasping by the user. A tray or bucket is secured to the frame for holding materials to be moved by the wheelbarrow. Once materials are loaded onto the tray, the user grasps and lifts the handles to balance the wheelbarrow on the wheel. The user then pushes the handles to roll the wheel over the ground and move the wheelbarrow to a desired location.

One limitation of conventional wheelbarrows is their large size. For residential use, the size of conventional wheelbarrows makes them difficult to transport to the residence from the store and also to store in a garage or shed once located at the residence. For commercial use, the size of conventional wheelbarrows can add to time and transportation costs of transporting equipment to and from job sites. Additionally, shipping and storage of large wheelbarrows can be very costly for manufacturers and retailers.

To overcome these problems, many foldable or collapsible wheelbarrows have been constructed. These collapsible wheelbarrows can be classified into two main classes, those with flexible fabric trays and those with rigid metal or plastic trays. The prior collapsible wheelbarrows with fabric trays are typically designed for "light duty" applications such as carrying leaves, grass clippings, or other lightweight items. The fabric trays typically hold a relatively small volume of material and the light-weight construction severely limits the amount of weight that can be moved at any one time. These wheelbarrows would be quickly destroyed in used in "heavy duty" applications such as heavy gardening or construction. The prior collapsible wheelbarrows with rigid trays are typically designed for heavy duty applications but are overly complex to produce and use. Additionally, in many cases the size of the collapsible wheelbarrow is not substantially reduced when collapsed. Furthermore, in many cases the ability to reduce the size of the collapsible wheelbarrow is at the expense of load carrying capacity or other desired feature of wheelbarrows such as, for example a "kicker" of adequate strength. The kicker is useful for quickly dumping a load of material from the tray by tilting the wheelbarrow forward until the kicker engages the ground and carries the weight of the wheelbarrow and load of materials and then rocking the wheelbarrow on the kicker to dump the material forwardly out of the tray. Accordingly, there is a need in the art for an improved collapsible wheelbarrow which can be utilized in heavy duty applications.

SUMMARY OF THE INVENTION

The present invention provides a wheelbarrow which overcomes at least some of the above-noted problems of the related art. According to the present invention, a wheelbarrow includes, in combination, a rigid front bracket, a wheel rotatably secured to the front bracket and rotatable about a horizontal, laterally extending axis of rotation, and first and second handle arms pivotably attached to the front bracket. The first and second handle arms are laterally pivotable about first and second pivot axes respectively. The first and second pivot axes are each spaced apart from the axis of rotation of the wheel.

According to another aspect of the present invention, a wheelbarrow includes, in combination a rigid front bracket, a wheel rotatably secured to the front bracket and rotatable about a horizontal, laterally extending axis of rotation, and first and second handle arms pivotably attached to the front bracket. The front bracket is generally U-shaped having a laterally extending front section and first and second laterally spaced-apart leg sections rearwardly extending from the front section and the first and second handle arms pivotably attached to the front bracket at the first and second leg sections respectively so that the first and second handle arms are laterally pivotable about first and second laterally spaced apart pivot axes. Each of the leg sections include spaced apart upper and lower walls and the first and second handle arms extend between the upper and lower walls.

According to yet another aspect of the present invention, a wheelbarrow includes, in combination, a rigid front bracket, a wheel rotatably secured to the front bracket and rotatable about a horizontal, laterally extending axis of rotation, first and second handle arms pivotably attached to the front bracket, and a rigid tray. A clamping device removably applies a clamping force between the first and second handle arms and clamps the tray between the first and second handle arms.

According to yet another aspect of the present invention, a wheelbarrow includes, in combination, a rigid front bracket, a wheel rotatably secured to the front bracket and rotatable about a horizontal, laterally extending axis of rotation, first and second handle arms pivotably attached to the front bracket, and a rigid tray removably secured to the first and second handle arms. The tray is interconnected with the first and second arms to permit relative movement therebetween in a lateral direction and to prevent relative movement therebetween in a forward rearward direction.

From the foregoing disclosure and the following more detailed description of various preferred embodiments it will be apparent to those skilled in the art that the present invention provides a significant advance in the technology of collapsible wheelbarrows. Particularly significant in this regard is the potential the invention affords for providing a high quality, reliable, simple, and easily assembled and collapsed assembly with improved operational performance. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
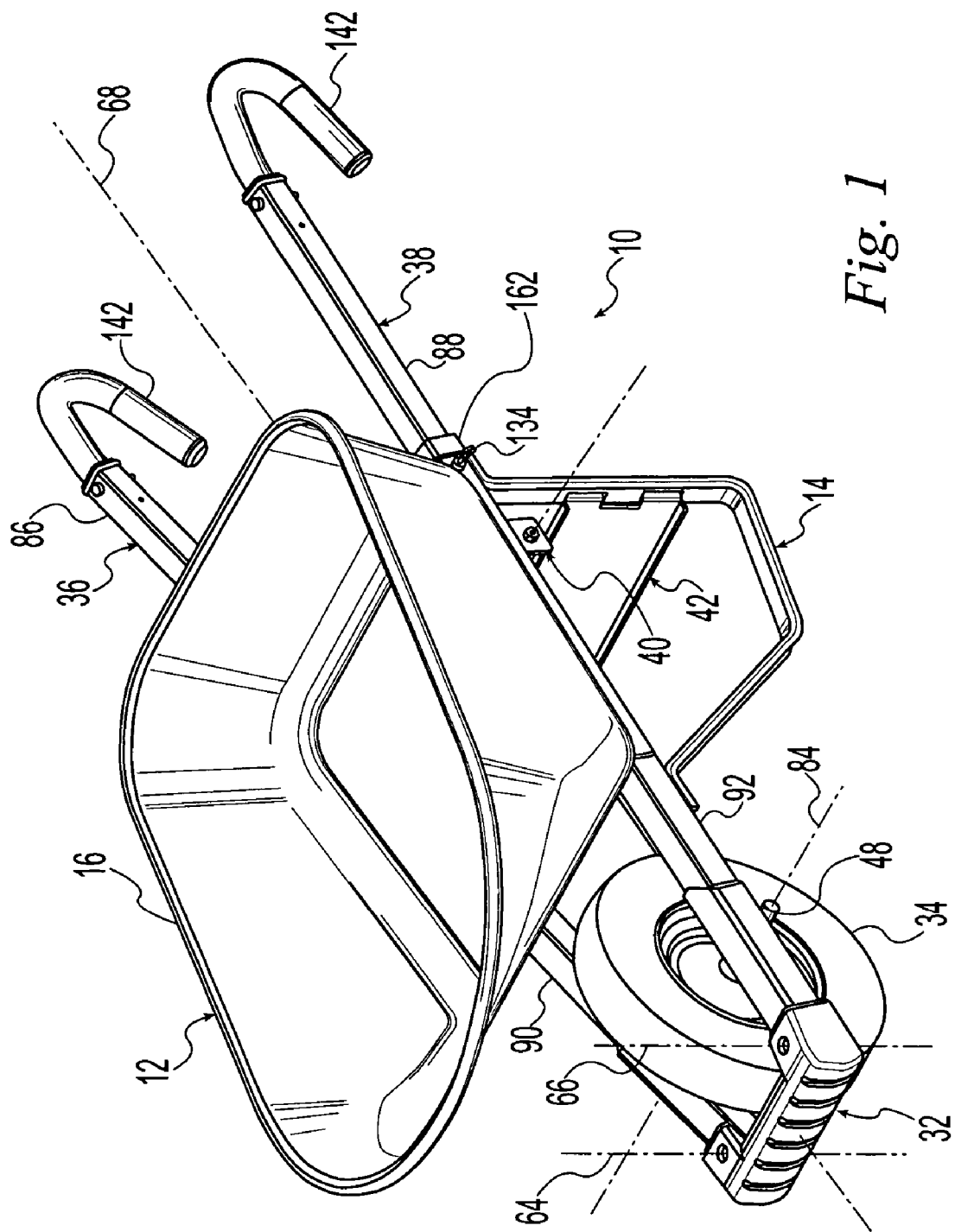
FIG. 1 is a top-left-front perspective view of a wheelbarrow according to a preferred embodiment of the present invention, wherein the wheelbarrow is in a working configuration.

It should be understood that the appended drawings are not necessarily to scale, presenting a somewhat simplified representation of various preferred features illustrative of the basic principles of the invention. The specific design features of the wheelbarrow as disclosed herein, including, for example, specific dimensions, orientations, and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the wheelbarrow illustrated in the drawings. In general, up or upward refers to an upward direction in FIG. 1 and down or downward refers to a downward direction in FIG. 1. Also in general, fore or forward refers to a direction toward the front of the wheelbarrow and a leftward direction in FIG. 1. Furthermore in general, aft, rear or rearward refers to a direction toward the rear of the wheelbarrow and a rightward direction in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved wheelbarrows disclosed herein. The following detailed discussion of various alternative and preferred embodiments will illustrate the general principles of the invention with reference to a wheelbarrow for heavy duty applications in residential or commercial environments. Other embodiments suitable for other applications will be apparent to those skilled in the art given the benefit of this disclosure.

Figure 2:
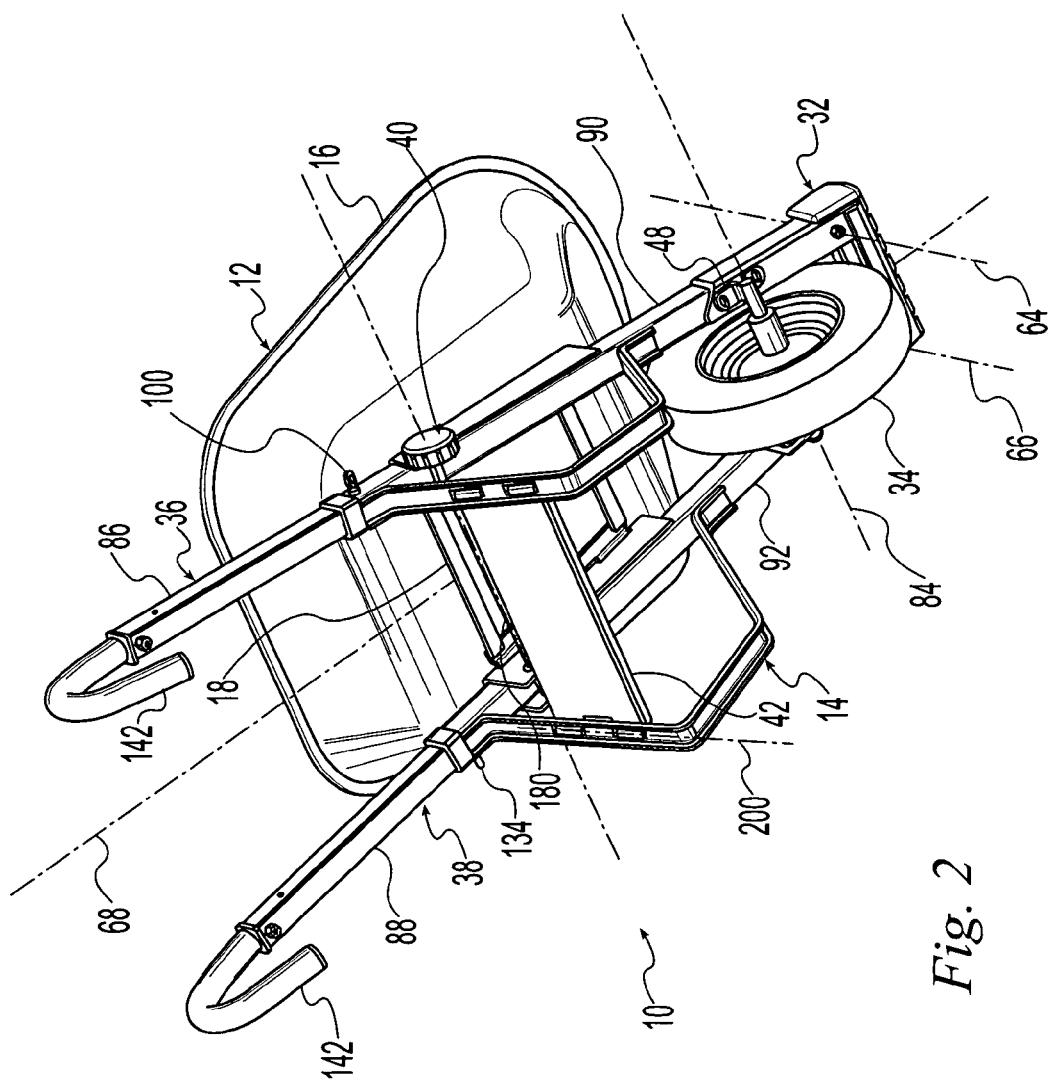
FIG. 2 is a bottom-right-rear perspective view of the wheelbarrow of FIG. 1.
Figure 3:
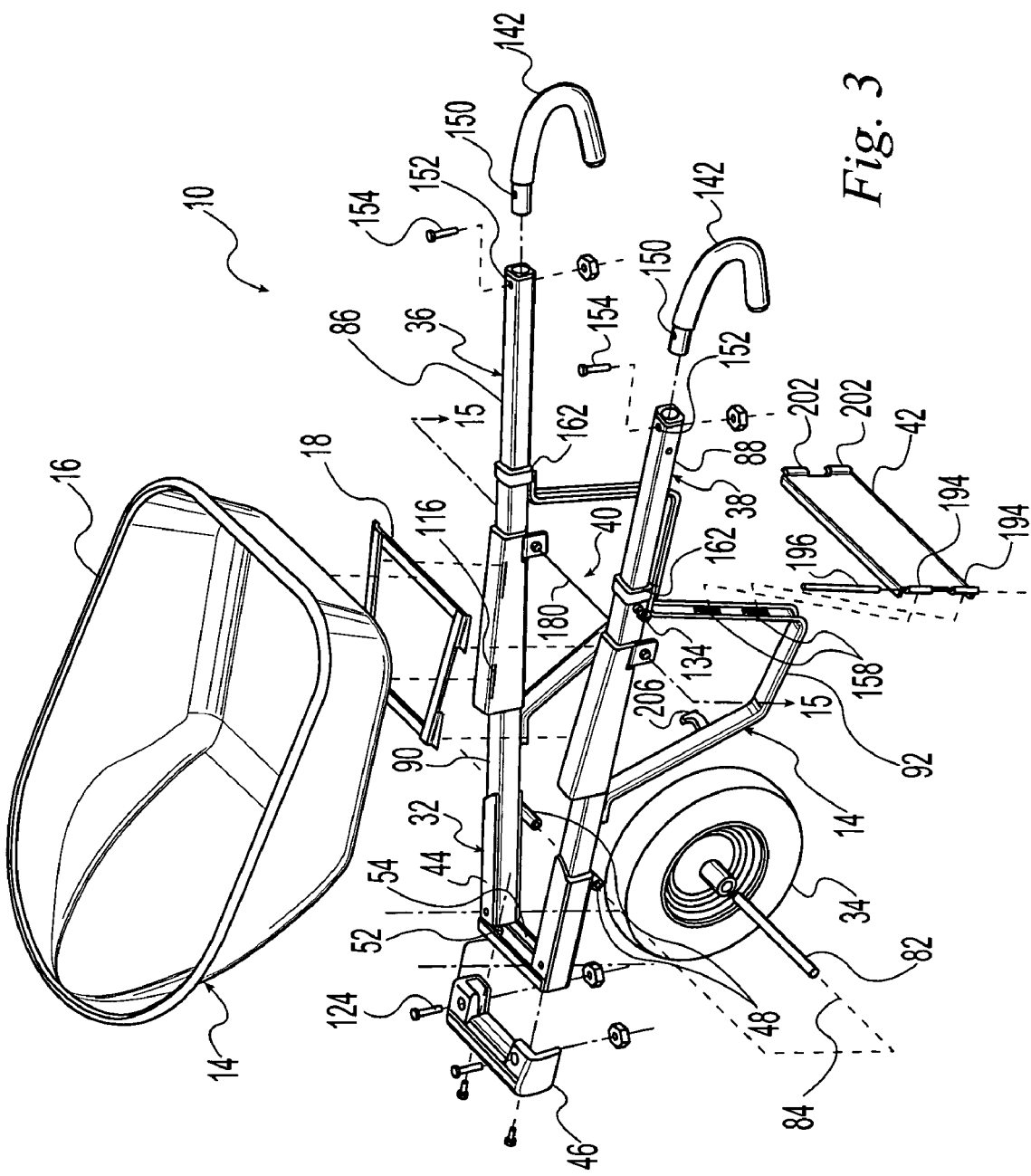
FIG. 3 is an exploded top-left-rear perspective view of the wheelbarrow of FIGS. 1 and 2.
Figure 4:
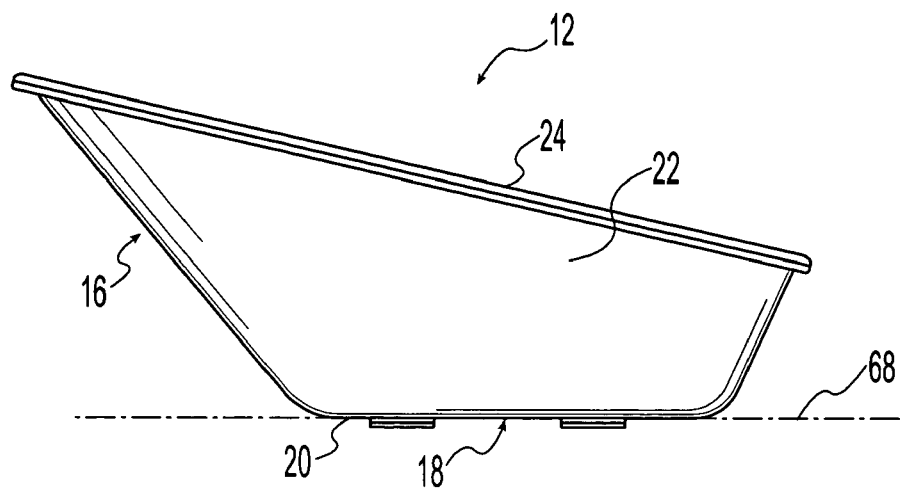
FIG. 4 is a left side elevational view of a removable tray assembly of the wheelbarrow of FIGS. 1 to 3.
Figure 5:
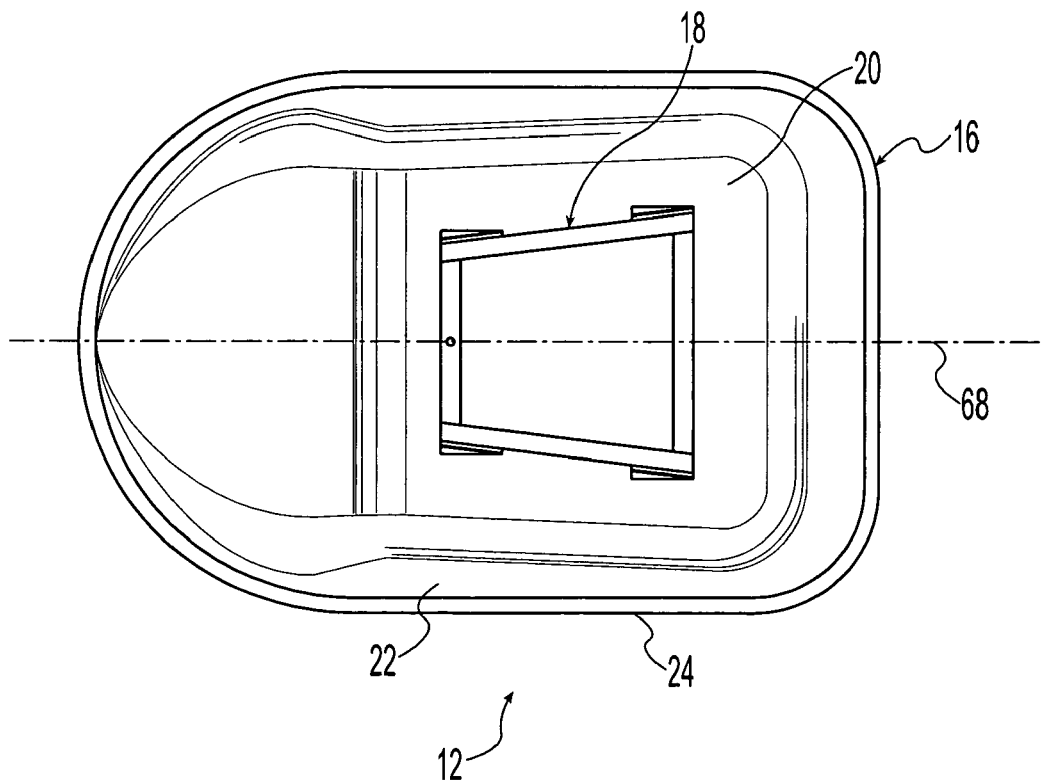
FIG. 5 is a bottom plan view of the removable tray assembly of FIG. 4.
Figure 7:
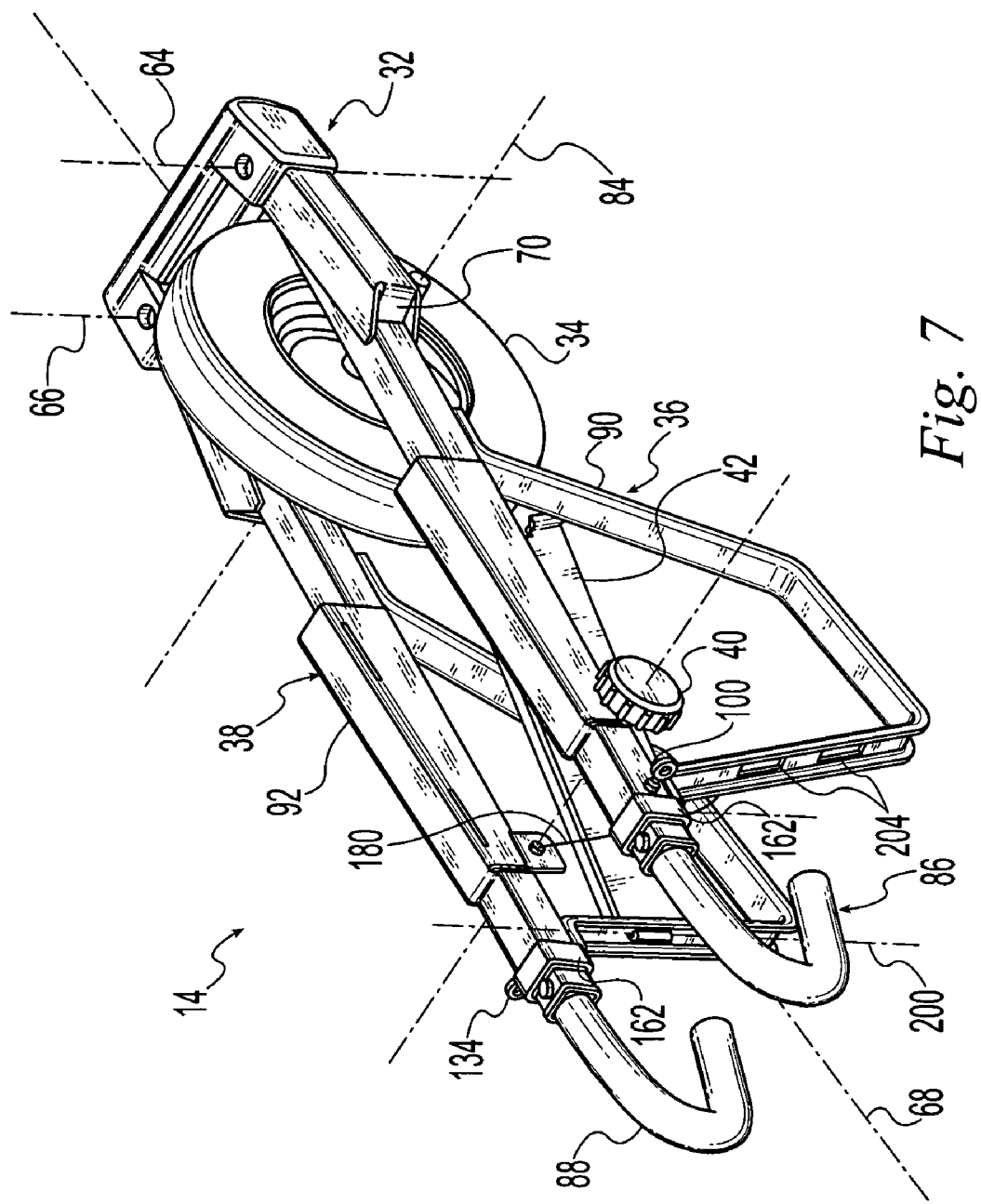
FIG. 7 is an top-right-rear perspective view of a frame assembly of the wheelbarrow of FIGS. 1 to 3, wherein the frame assembly is folded into a shipping or storage configuration.

Referring now to the drawings, FIGS. 1 to 3 illustrate a wheelbarrow 10 according to a preferred embodiment of the present invention which can be easily collapsed and assembled between a working or load carrying configuration (best shown in FIGS. 1 to 3) and a shipping or storing configuration (best shown in FIGS. 4, 5 and 7). The illustrated wheelbarrow 10 includes a tray assembly 12 which is removably secured to a frame assembly 14.

As best shown in FIGS. 4 and 5, the illustrated tray assembly 12 includes a rigid tray or platform 16 for carrying a load of material and an attachment or mounting bracket 18 secured to the tray 16 for removably securing the tray 16 to the frame assembly 14. The tray 16 is preferably of standard size and shape having a substantially flat bottom wall 20 and a side wall 22 upwardly extending from the edge of the bottom wall 20 to an outwardly turned lip 24 forming a top opening. The illustrated tray 16 forms an interior space for holding material to be transported by the wheelbarrow 10. The Illustrated tray 16 is sized to hold about six cubic feet of material but other suitable sizes such as, for example, four cubic feet, eight cubic feet, or ten cubic feet can be utilized. The illustrated tray 16 is formed of a metal such as, for example, steel but other suitable materials can be utilized such as, for example, fiberglass or plastic. It is noted that while the illustrated tray 16 is in the form of a container, the tray 16 can alternatively take any other form suitable for supporting a desired load such as, for example, a flat bed, a flexible cloth or tarp, supports for retaining firewood, or the like.

Figure 6:
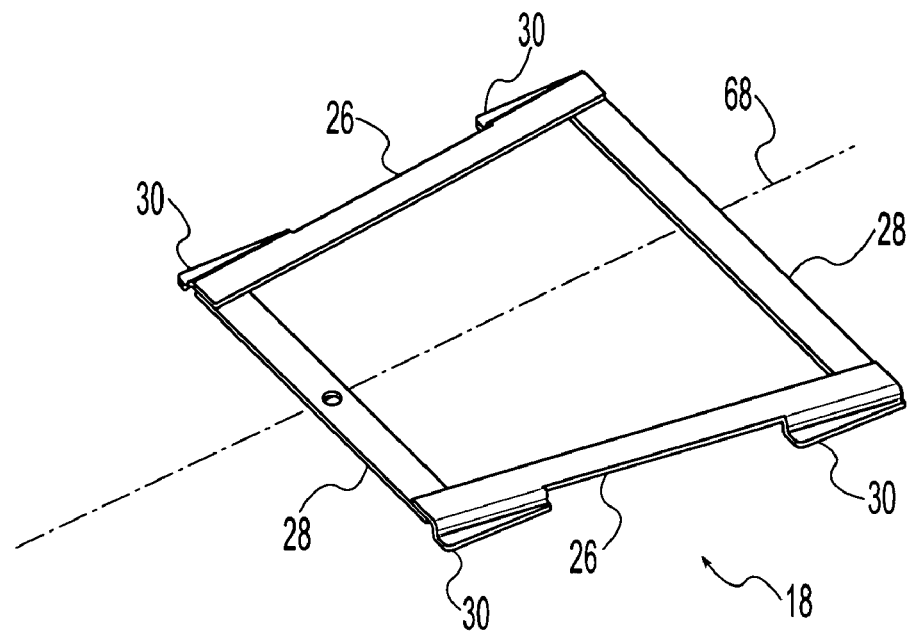
FIG. 6 is a top-left-front perspective view of an attachment bracket of the removable tray assembly of FIGS. 4 and 5.

As best shown in FIG. 6, the illustrated attachment bracket 18 includes a pair of laterally spaced apart arms 26. The illustrated arms 26 are secured together by a pair of longitudinally spaced apart connecting members 28. The illustrated arms and members 26, 28 are generally elongate and planar but any other suitable shape can be utilized. The illustrated arms and members 26, 28 are separately formed of a metal such as steel and then welded together but alternatively can be formed of any other suitable material, secured together by any other suitable method, and/or formed as a unitary component. The illustrated arms 26 form an acute angle relative to one another to form a trapezoid shape. The angle is selected to cooperate with an angle formed by the frame assembly 14 when the wheelbarrow 10 is in the working configuration. Each arm 26 carries a pair of longitudinally spaced apart mounting tabs 30 which extend laterally outward. The mounting tabs 30 are sized and shaped to cooperate with the frame assembly 14 to removably secure the tray assembly 12 to the frame assembly 14 as described in more detail hereinafter. The illustrated mounting tabs 30 have a decreasing lateral width in a direction from a forward edge to a rearward edge. Shaped in this manner, the lateral outer edges of the mounting tabs 30 are substantially parallel to each other and the central longitudinal axis 68. The illustrated mounting tabs 30 are substantially planar, parallel to the arms 26, and spaced below the arms 26. The illustrated mounting tabs 30 are formed unitary with the arms 26 but alternatively can be separate components secured thereto.

As best shown in FIGS. 4 and 5, the illustrated attachment bracket 18 is secured to the bottom wall 20 of the tray 16 so that the mounting tabs 30 are substantially parallel to and spaced below the bottom wall 20 of the tray 16. The illustrated mounting bracket 18 is secured to the tray 16 by welding but other suitable methods can be utilized such as, for example, rivets, bolts or other suitable fastening means. It is noted that the illustrated tray 16 is free of openings so that the tray 16 can hold fluids such as water. It is noted that a pluggable drain hole can also be provided if desired.

As best shown in FIGS. 1 to 3 and 7, the illustrated frame assembly 14 includes a nose assembly 32 having at least one rotatable wheel 34 for supporting the wheelbarrow 10, right and left arm assemblies 36, 38 pivotably attached to the nose assembly 32 for a user to manually manipulate the wheelbarrow 10, a tensioning or clamping device 40 operating between the arm assemblies 36, 38 for securing the tray assembly 12 between the arms assemblies 36, 38 when the wheelbarrow 10 is in the working configuration, and a support arm 42 extending between the arm assemblies 36, 38 for rigidifying the frame assembly 14 when the wheelbarrow 10 is in the working configuration.

Figure 8:
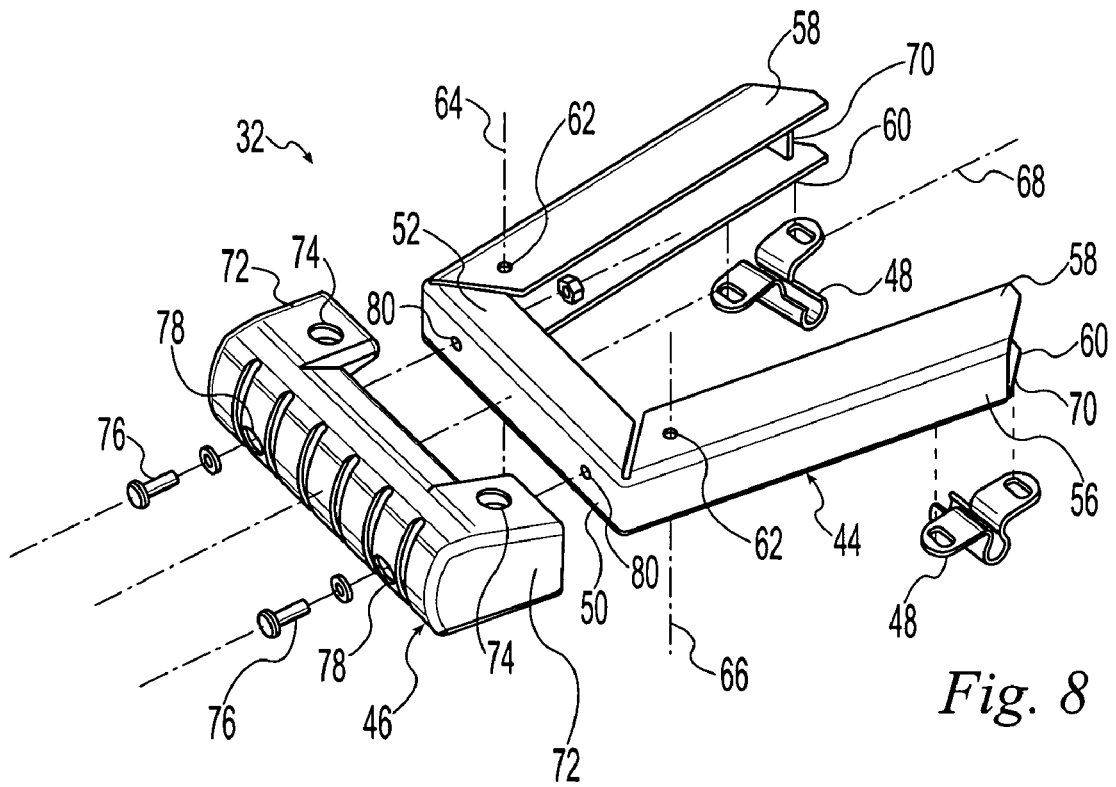
FIG. 8 is an exploded top-left-front perspective view of a nose assembly of the frame assembly of FIG. 7.

As best shown in FIGS. 3 and 8, the illustrated nose assembly 32 includes a front bracket 44, a kicker or bumper 46, and a pair axle supports 48. The illustrated front bracket 44 is generally U-shaped having a laterally extending front section and a pair of leg sections rearwardly extending from the ends of the front section. The illustrated front section is generally channel-shaped having a vertically extending main wall or plate 50 with integral upper and lower walls or plates 52, 54 rearwardly and generally perpendicularly extending from upper and lower edges of the main wall 50 respectively. The illustrated leg sections form an acute angle relative to one another which is selected to cooperate with the angle desired to be formed by the arm assemblies 36, 38 when the wheelbarrow 10 is in the working configuration. Each of the illustrated leg sections are generally channel-shaped having a vertically extending main wall 56 with upper and low walls 58, 60 inwardly extending in the lateral direction from upper and lower edges of the main wall 56 respectively. The leg sections are sized and shaped to receive the arm assembles 36, 38 between the upper and lower walls 58, 60 as described in more detail hereinafter. Coaxial openings 62 are formed in the upper and lower walls 58, 60 of each of the leg sections to form parallel and laterally spaced-apart pivot axes 64, 66 for the arm assemblies 36, 38 as described in more detail herein after. The illustrated pivot axes 64, 66 are located near the forward end of the leg sections and are substantially perpendicular to a central longitudinal axis 68 of the wheelbarrow 10. Each illustrated leg section is provided with a blocking flange 70 inwardly extending between the upper and lower walls 58, 60 which cooperates with the arm assemblies 36, 38 to prevent entry of objects into the leg sections. The front bracket 44 is preferably formed of a metal such as, for example steel, but alternatively any other suitable material can be utilized.

The front bumper 46 is sized and shaped to engage the ground when the wheelbarrow 10 is tipped forward for dumping as described in more detail herein after. The bumper 46 is preferably molded of rubber, plastic, or other shock absorbing material but can alternatively be formed in any suitable manner and of any suitable material. The illustrated bumper 46 forms a pocket for closely receiving the main section of the front bracket 44 therein and has rearwardly extending legs 72 which partially extend over/under the leg sections of the front bracket 44. Openings 74 are provided in the legs 72 to cooperate with the openings 62 in the front bracket 44. The illustrated bumper 46 is secured to the front bracket 44 with a pair of laterally spaced apart fasteners 76 in the form of bolts, washers, and nuts. Suitable openings 78, 80 for the fasteners 76 are provide in the bumper 46 and the front bracket 44. It is noted that the bumper 46 can alternatively be secured to the front bracket 44 in any other suitable manner.

The illustrated axle supports 48 are sized and shaped to support an axle 82 of the wheel 34 to rotationally secure the wheel 34 to the front bracket 44. The illustrated axle supports 48 are secured below the lower wall 60 of the leg sections of the front bracket 44 near the rearward end of the lower walls 60. The axle supports 48 are preferably oriented so that the rotational axis 84 of the wheel 34 extends in a lateral direction substantially perpendicular to the central longitudinal axis 68 of the wheelbarrow 10 and substantially perpendicular to pivot axes 64, 66 of the arm assemblies 36, 38. The axle 82 extends through the wheel 34 and between the axle supports 48. Mounted in this manner the wheel 34 is located between the leg sections of the front bracket 44 and is rotatable about its rotational axis 84 relative to the front bracket 44. The wheel 34 can be of any suitable type. It is noted that while the illustrated nose assembly 32 includes a single wheel 34, alternatively a plurality of wheels can be utilized either between the leg sections and/or laterally outward of the leg sections.

The right and left arm assemblies 36, 38 are each pivotably attached to the nose assembly 32 so that they can be selectively pivoted laterally inward and outward about the pivot axes 64, 66. The right and left arm assemblies 36, 38 each include telescoping upper arm assemblies 86, 88 and lower arm assemblies 90, 92 so that the right and left upper arm assemblies 86, 88 can be selectively moved between an extended or working position and a retracted or storing position which has a length shorter than the extended position. It is noted that while the illustrated right and left arm assemblies 36, 38 can be selectively telescoped to change their length, the arm assemblies 36, 38 can alternatively be configured to change length in other manners such as, for example, folding or can alternatively be configured to have a fixed length.

Figure 9:
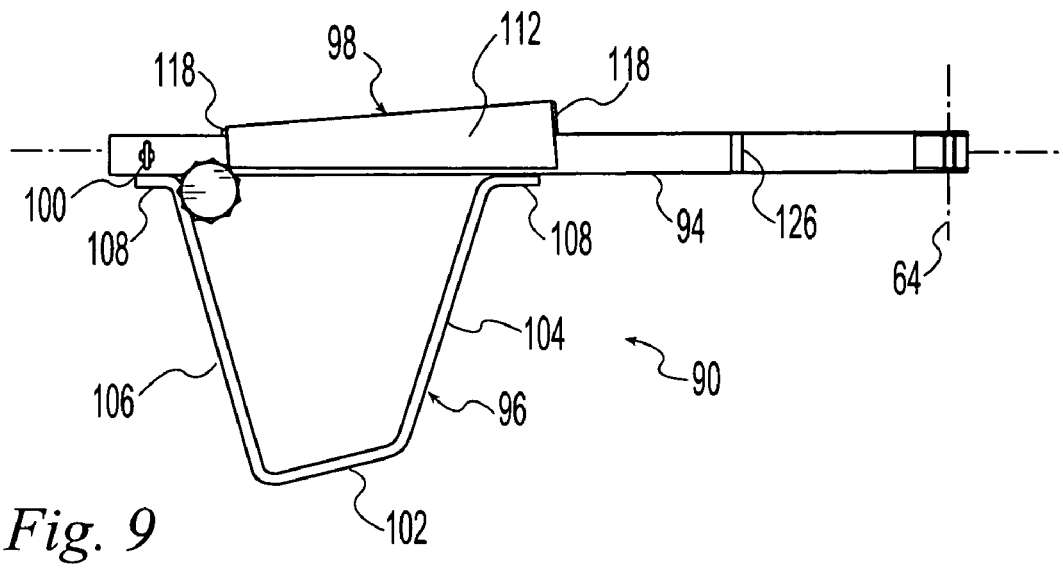
FIG. 9 is a right side elevation view of a right lower arm assembly of the frame assembly of FIG. 7.
Figure 10:
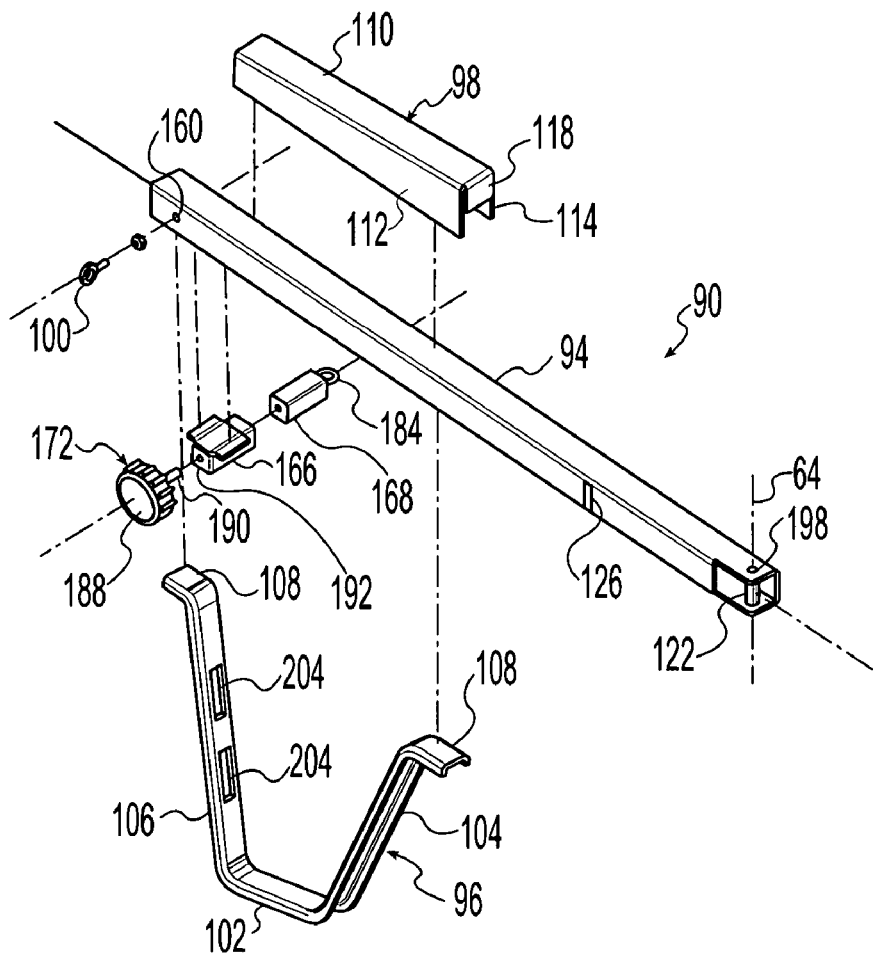
FIG. 10 is an exploded top-right-front perspective view of the right lower arm assembly of FIG. 9.

As best shown in FIGS. 9 and 10, the illustrated right lower arm assembly 90 includes a right lower arm 94, a right leg 96, a right tray bracket or wedge 98, and releasable fastener 100 for cooperating with the right upper arm assembly 86. The illustrated right lower arm 94 is an elongate square tube sized and shaped to extend into the right leg section of the front bracket 44. The right lower arm 94 is preferably formed of steel but any other suitable material can alternatively be utilized such as, for example, wood or fiberglass. The illustrated right leg 96 has a bottom portion 102 sized and shaped to engage the ground to support the wheelbarrow 10 and front and rear portions 104, 106 upwardly extending from the ends of the bottom portion 102. Upper ends of the front and rear portions 104, 106 form flanges 108 for engaging the right lower arm 94. The front and rear portions 104, 106 are sized and shaped so that the right lower arm 94 angles upwardly in a rearward direction when the bottom portion 102 is supporting the wheelbarrow 10 on the ground in a standard manner. The illustrated right leg 96 is formed of a metal such as steel and welded to the right lower arm 94 but any other suitable material and/or attachment method can be utilized.

The right tray bracket 98 is sized and shaped to cooperate with the tray assembly 12 to releasably secure the tray 16 to the frame assembly 14. The illustrated right tray bracket 98 has an elongate upper wall 110 sized and shaped for supporting the tray 16, and inner and outer walls 112, 114 downwardly extending form lateral inner and outer edges of the upper wall 110. The inner wall 112 is provided with a pair of collinear and longitudinally spaced apart openings in the form of slots 116 (FIG. 3) sized and shaped for receiving a pair of the mounting tabs 30 of the tray assembly 12. The slots 116 are preferably sized to closely receive the mounting tabs 30 to limit movement of the tray assembly 12 relative to the tray bracket 98 when the mounting tabs 30 are within the slots 116. The right tray bracket 98 is secured to the right lower arm 94 with the inner and outer walls 112, 114 extending about opposed lateral sides of the right lower arm 94 and the upper wall 110 spaced above the top of the right lower arm 94 so that the mounting tabs 30 can be inserted into the slots 116 above the right lower arm 94. The illustrated right tray bracket 98 is provided with end walls 118 sized and shaped for spacing the upper wall 110 an adequate distance above the right lower arm 94. The right tray bracket 98 is preferably formed of a metal such as steel and welded to the right lower arm 94 but any other suitable material and/or fastening method can alternatively be utilized. The right tray bracket 98 is shaped in a wedge-like manner so that the tray 16 and arm assemblies 37, 38 form a shape and orientation of standard wheelbarrows. It is noted that the right tray bracket 98 can alternatively be eliminated with the slots 116 being formed directly in the right lower arm 94.

The forward end of the right lower arm 94 is provided with coaxial openings 120 sized and located to cooperate with the openings 62 of the front bracket 44 to form the right pivot axis 64. Preferably, a bearing member 122 is provided between the openings 120 to provide additional support. With the forward end of the right lower arm 94 extending into the right leg section of the front bracket 44, the right lower arm 94 is pivotably secured to the front bracket 44. The illustrated right lower arm 94 is secured with a fastener 124 (FIG. 3). The illustrated fastener 124 is a bolt and nut but any other suitable fastening means can alternatively be utilized. Pivotably secured in this manner, the right lower arm 94 can pivot inwardly toward and outwardly away from the central longitudinal axis 68 of the wheelbarrow 10. The main wall 56 of the right leg section provides an outward stop limiting pivotable motion in the outward direction. The right lower arm 94 is provided with an opening 126 sized and shaped to receive the blocking flange 70 of the right leg section of the front bracket 44. Preferably the blocking flanges 70 is provided with a chamfer to assure that the blacking flange 70 enters the opening upon slight misalignment therebetween. As the right lower arm 94 pivots away from the main wall 56, the blocking flange 70 prevents any opening from forming between the main wall 56 and the right lower arm 94 to prevent any objects from undesirably entering therebetween. It is noted that the blocking flanges 70 and openings 126 can be eliminated if desired.

Figure 11:
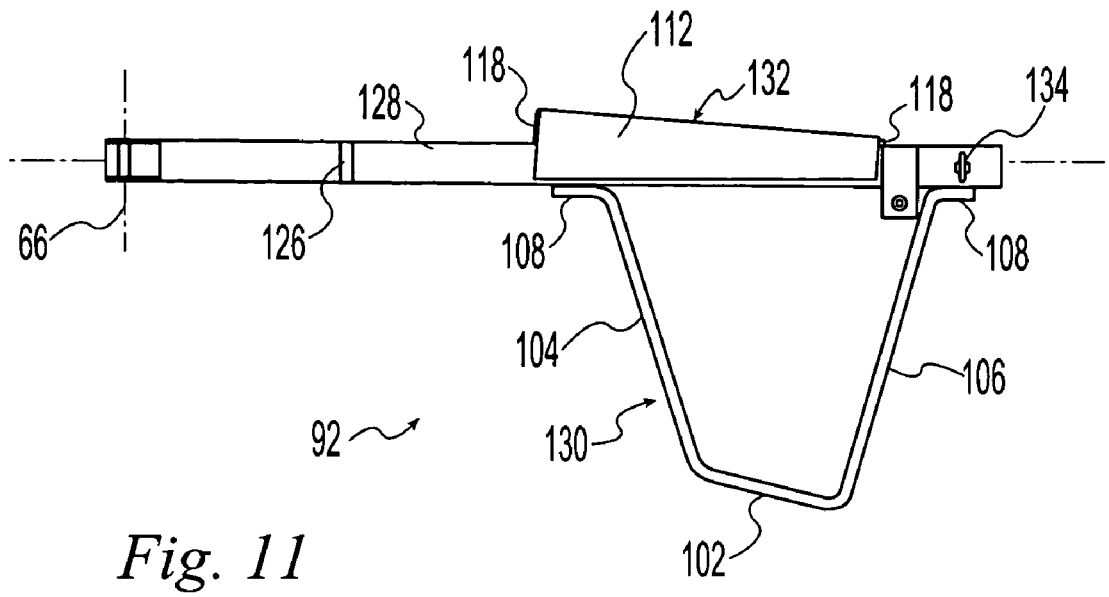
FIG. 11 is a left side elevation view of a left lower arm assembly of the frame assembly of FIG. 7.
Figure 12:
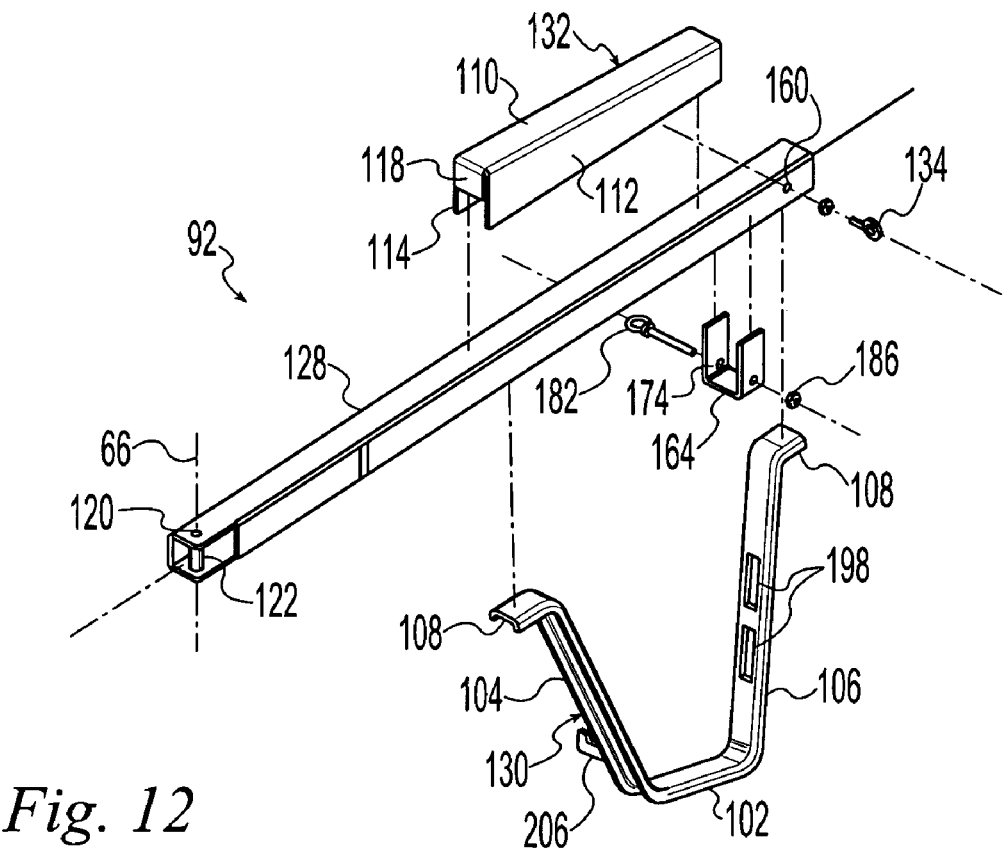
FIG. 12 is an exploded top-left-front perspective view of the left lower arm assembly of FIG. 11.

As best shown in FIGS. 11 and 12, the illustrated left lower arm assembly 92 includes a left lower arm 128, a left leg 130, a left tray bracket or wedge 132, and releasable fastener 134 for cooperating with the left upper arm assembly 88. The illustrated left lower arm assembly 92 is substantially a mirror image of the above described right lower arm assembly 90 and therefore will not be described in further detail since the above description for the right lower arm assembly 90 applies here to the left lower arm assembly 92 as well.

Figure 13:
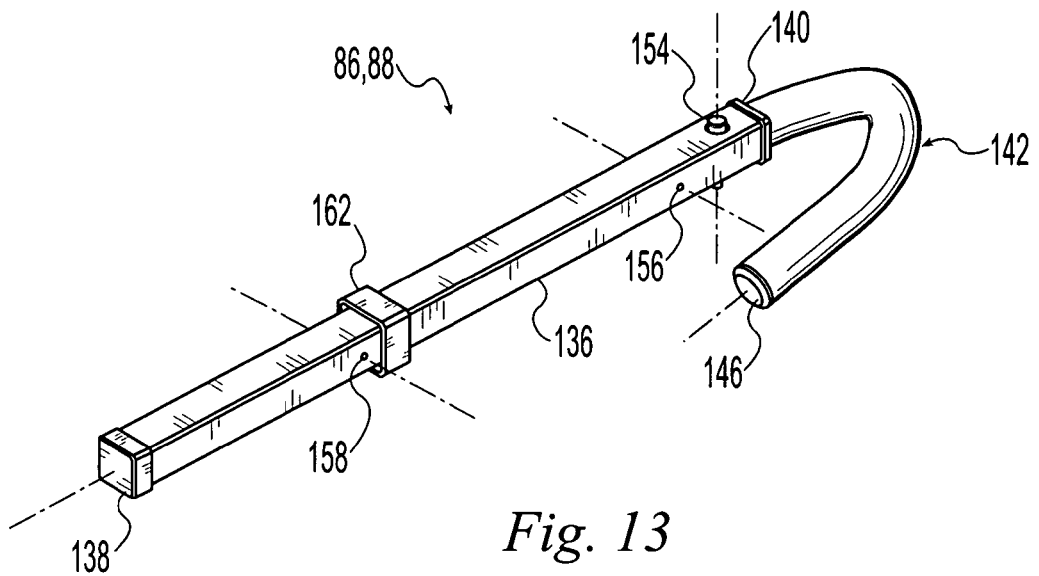
FIG. 13 is top-left-front perspective view of an upper arm assembly of the frame assembly of FIG. 7.
Figure 14:
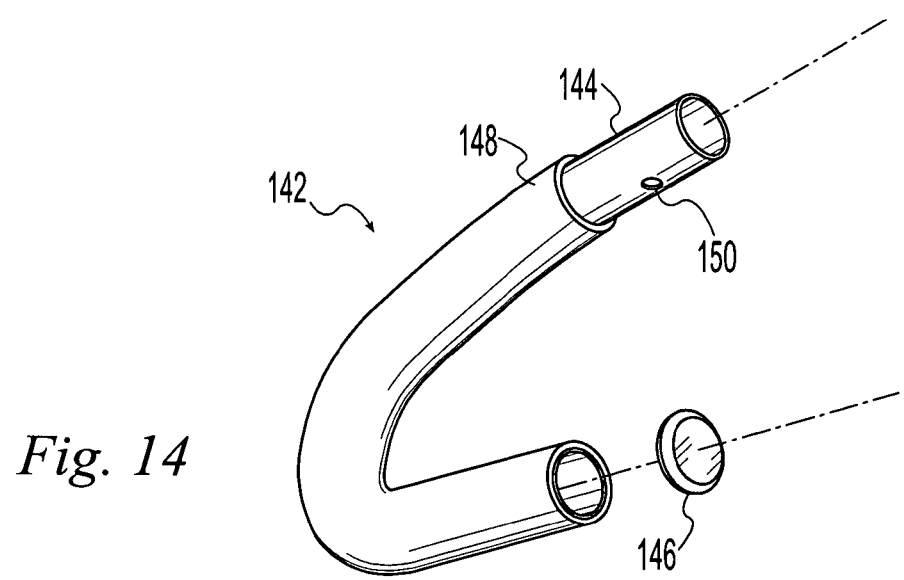
FIG. 14 is an exploded perspective view of a handle of the upper arm assembly of FIG. 13.
Figure 15:
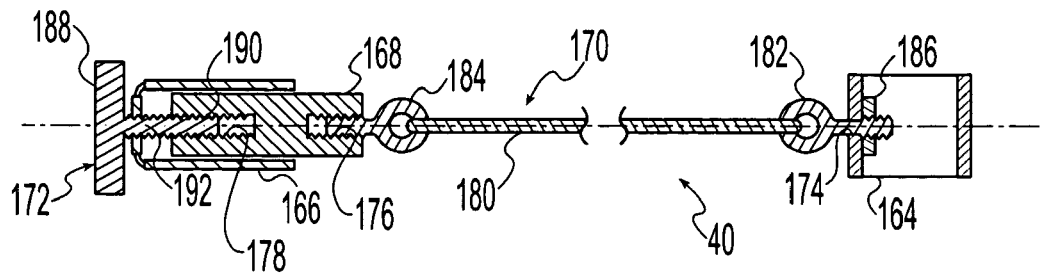
FIG. 15 is a cross sectional view taken along line 15-15 of FIG. 3.

As best shown in FIGS. 13 and 14, the illustrated right and left upper arm assemblies 86, 88 each include an upper arm 136, front and rear end caps 138, 140, and a handle 142. The illustrated upper arm 136 is an elongate square tube sized and shaped to longitudinally extend into the lower arms 94, 128 in a telescoping manner. The upper arm 136 is preferably formed of steel but any other suitable material can alternatively be utilized such as, for example, wood or fiberglass. The forward end of the upper arm 136 is provided with the front end cap 138 which is preferably in the form of a plug which closes the open forward end of the upper arm 136. The illustrated front end cap 138 is formed of plastic but any other suitable material can be utilized. The front end cap 138 is preferably and sized and shaped to eliminate or minimize metal to metal contact between the upper arm 136 and the lower arms 94, 128. The rearward end of the upper arm 136 is provided with the rear end cap 140 which is preferably in the form of a plug which closes the open rearward end of the upper arm 136 except for a passage for the handle 142. The illustrated rear end cap 140 is formed of plastic but any other suitable material can be utilized. The rear end cap 140 is preferably sized and shaped to eliminate or minimize metal to metal contact between the upper arm 136 and the handle 142.

The illustrated handle 142 includes a handle arm 144, an end cap 146, and a grip or covering 148. The illustrated handle arm 144 is an elongate round tube sized and shaped to longitudinally extend into the rearward end of the upper arm 136. The handle arm 144 is preferably formed of steel but any other suitable material can alternatively be utilized such as, for example, plastic. The illustrated handle arm 144 is generally J-shaped but any other suitable shape can be utilized. The J-shape of the handle arm 144 is useful in tipping the wheelbarrow 10 without the user removing their hands from the handle 142 as described in more detail hereinafter. The free end of the illustrated handle arm 144 is provided with the end cap 146 which is preferably in the form of a plug which closes the open free end of the handle arm 144. The illustrated end cap 146 is formed of plastic but any other suitable material can be utilized. The exposed outer surface of the handle arm 144 is covered by the covering 148. The illustrated covering 148 is an elongate tube of flexible material. The covering 148 can comprise a foam material or any other suitable material for providing a suitable gripping and/or cushioning surface.

The connecting end of the illustrated handle arm 144 is provided with a vertically extending opening 150 which cooperates with a vertically extending opening 152 (FIG. 3) in the rearward end of the upper arm 136 to receive a mechanical fastener 154 to rigidly secure the handle arm 144 to the upper arm 136. The illustrated mechanical fastener 154 is in the form of a bolt and nut but any other suitable fastening means can be utilized such as, for example, welding, rivets, spring clips, or spring-lock pins. It is noted that the illustrated handle 142 can be oriented in a downward extending position (as shown in FIG. 13) which aids in dumping actions or rotated 180 degrees to an upward extending position (not specifically shown) which aids in load carrying actions. The user can remove and replace the fastener 154 to orient the handles 142 in the positions as desired. It is noted that alternatively, the handle arm 144 can be permanently secured to the upper arm 136 such as, for example by welding. If permanently secured in this manner, the handle 142 is switched between the upward and downward positions by flipping the entire upper arm 136. It is noted that the holes 156, 158 must extend through both sides of the upper arm 136 for the upper arm 136 to be flipped in this manner.

As best shown in FIG. 13, the upper arm 136 is provided with a first laterally extending opening 156 near the rearward end of the upper arm 136 and a second laterally extending opening 158 forwardly spaced from the first opening 156. The first and second openings 156, 158 define the retracted and extended positions of the upper arm assemblies 86, 88 respectively. As best shown in FIGS. 10 and 12, the right and left lower arms 94, 128 are each provided with a laterally extending opening 160 (FIGS. 10 and 12) which cooperates with the openings 156, 158 of the upper arms 136 to receive the mechanical fastener 100, 134 (FIGS. 10 and 12) to rigidly secure the upper arm assemblies 86, 88 to the lower arm assemblies 90, 92. The illustrated mechanical fastener 100, 134 is in the form of a spring-lock pin and secured to the lower arms 94, 128 by a nut welded to the lower arms 94, 128 but any suitable fastening means can be utilized such as, for example, welding, rivets, spring clips, or bolts. By releasing the fastener 100, 134, the user can adjust the upper arm assemblies 86, 88 between the retracted and extended positions as desired. It is noted that while the illustrated embodiment provides two fixed positions, a greater or lesser number of fixed positions or infinite adjustability can be alternatively provided. As best shown in FIGS. 3 and 13, the rearward end of the illustrated lower arms 94, 128 are provided with rear end caps 162 which are in the form of plugs which close the open rearward ends of the lower arms 94, 128 except for a passage for the upper arms 136. The illustrated rear end caps 162 are formed of plastic but any other suitable material can be utilized. The rear end caps 162 are preferably sized and shaped to eliminate or minimize metal to metal contact between the upper arms 136 and the lower arms 94, 128 and prevent entry of foreign materials into the lower arms 94, 128.

The tensioning or clamping device 40 operates between the lower arm assemblies 90, 92 to clamp the tray assembly 12 between the arm assemblies 36, 38. The clamping device 40 provides a laterally extending force on the lower arm assemblies 90, 92 in a direction substantially perpendicular to the central longitudinal axis 68 and substantially parallel to the rotational axis 84 of the wheel 34. As best shown in FIGS. 3, 10, 12, and 15, the illustrated clamping device 40 includes tension bracket 164, a tension housing 166, a tension block 168, a cable assembly 170, and a drive screw 172. The illustrated tension bracket 164 is generally U-shaped having side walls sized and shaped to be positioned on lateral sides of the of the left lower arm 128 and a bottom wall laterally extending below the left upper arm 128. The illustrated inner side wall is provided with an opening 174 for attachment of the cable assembly 170. The illustrated tension bracket 164 is formed of a metal such as steel but any other suitable material can be utilized. The illustrated tension bracket 164 is welded to the left lower arm 128 but any other suitable attachment method can be utilized or the tension bracket 164 can be formed integral with another component. The illustrated tension housing 166 is generally box-shaped and sized and shaped to be positioned below the right lower arm 94. The illustrated tension housing 166 is welded to the right lower arm 94 but any other suitable attachment method can be utilized or the tension housing 166 can be formed integral with another component. The tension block 168 is sized and shaped to be closely received within the tension housing 166 for sliding movement relative to the tension housing 166 in the lateral direction. The illustrated tension block 168 is formed of a metal such as steel but any other suitable material can be utilized. The lateral ends of the tension block 168 are each provided with threaded openings 176, 178.

The cable assembly 170 laterally extends between the tension bracket 164 and the tension block 168. The illustrated cable assembly 170 includes an elongate flexible cable 180 and first and second eyebolts 182, 184 secured to the ends of the cable 180. The cable 180 is preferably a stranded wire rope having a plastic protective covering but any suitable cable can alternatively be utilized. The first eyebolt 182 extends through the opening 174 in the tension bracket 164 and is rigidly secured to the tension bracket 164 by a fastener 186 such as the illustrated nut. The second eyebolt 184 extends into the threaded opening 176 of the tension block 168 to be rigidly secured to the tension block 168. The illustrated drive screw 172 includes a handle portion 188 located laterally outward of the tension housing 166 and a screw portion 190 extending laterally inward from the handle portion 188 and through an opening 192 in the tension housing 166 to the tension block 168. The screw portion 190 extends into the outer threaded opening 178 of the tension block 168. When the handle portion 188 rotates, the screw portion 190 threads into and out of the tension block 168, depending on the direction of rotation, to decrease and increase the effective length of the clamping device 40 so that the tray assembly 12 can be clamped between the arm assemblies 36, 38 by decreasing the length and released by increasing the length. Because the cable 180 is flexible, the arm assemblies 36, 38 can still be pivoted inward to the storage configuration. It is noted that while the illustrated clamping device 40 includes a flexible cable 180, any other suitable type of clamping device can be utilized such as, for example, a turnbuckle or a tension bar. It is also noted that the tray assembly 12 can be secured to the frame assembly 14 in any other suitable manner such as, for example, tensioning the arm assemblies 36, 38 in a laterally outward direction to engage the tray assembly 12, buttons extending in keyhole-shaped openings, or any other suitable locking configuration.

As best shown in FIGS. 1 to 3, the support arm 42 extends between the lower arm assemblies 90, 92 for rigidifying the frame assembly 14 when the wheelbarrow 10 is in the working configuration. The illustrated support arm 42 is a generally planar panel having perpendicularly extending upper and lower flanges formed for additional stiffness. The left end of the illustrated support arm 42 is provided with a pair of vertically spaced-apart hinge members 194 sized and shaped for receiving a hinge pin 196 therein. The rear portion of the left leg 130 is provided with a pair of vertically spaced apart apertures 198 for passage of the hinge members 194 therethrough. With the support arm located on the forward side of the rear portions of the legs 96, 130, the hinge members 194 extending through apertures 198, and the hinge pin 196 within the hinge members 194 on a rearward side of the rear portion of the left leg 130, the support arm 42 is selectively pivotable about a pivot axis 200 generally defined by the longitudinal axis of the hinge pin 196. The right end of the illustrated support arm 42 is provided with a pair of vertically spaced-apart locking tabs 202 sized and shaped for interlocking with the rear portion of the right leg 96. The rear portion of the right leg 96 is provided with a pair of vertically spaced apart apertures 204 for receipt of the locking tabs 202. With the locking tabs 202 within the apertures 204, the support arm 42 is clamped between the leg assemblies 36, 38 when the clamping device 40 is tensioned. When the clamping device 40 is untensioned, the support arm 42 is pivotable to a storage position adjacent the left leg 130 so that the arm assemblies 36, 38 can be pivoted inward to the storage configuration. The illustrated left leg 130 is provided with a retaining bracket 206 for releasably retaining the support arm 42 in its storage position. It is noted that while the illustrated support arm 42 is pivotably attached to the left leg 130, the support arm 42 can alternatively be hinged to the right leg 96, hinged to both legs 96, 130, or take other forms.

The wheelbarrow 10 can advantageously be shipped and sold with the tray assembly 12 removed and the frame assembly 14 in the storage configuration, that is, with the upper arm assemblies 86, 88 in their retracted positions and the arm assemblies 36, 38 pivoted inward toward the central longitudinal axis 68 as best shown in FIG. 7. The frame assembly 14 can be packaged in an individual carton having a handle. For display, the tray assemblies 12 can be stacked one on top of another and the cartons with the frame assemblies 14 can be separately stacked one on top of another. Upon purchase, a purchaser takes one of the tray assemblies 12 and a separate one of the cartons containing the frame assembly 14.

To place the wheelbarrow 10 in the working configuration, the user outwardly pivots the arm assemblies 36, 38 away from the central longitudinal axis 68 about their pivot axes 64, 66 until the cable 180 is tensioned. It is noted that the illustrated clamping device 40 can provide an outer limit for the arm assemblies 36, 38, when the cable 180 is secured, which positions the arm assemblies 36, 38 in a released but near clamping position. The support arm 42 is pivoted and the tabs 202 are placed in the apertures 204. Each of the fasteners 100, 134 are pulled to release the upper arms 136 and the upper arms 136 are pulled rearwardly relative to the lower arms 94, 128 until the upper arms 136 are in their extended positions and the fasteners 100, 134 engage the second openings 158 to rigidly lock the upper arms 136 to the lower arms 94, 128. The tray 16 is then placed on top of the tray brackets 98, 132 with the mounting tabs 30 located rearward of the slots 116. The tray assembly 12 is moved forward until the mounting tabs 30 at least partially enter the slots 116. The drive screw 172 is then turned to tension the cable 180 and pull the arm assemblies 36, 38 toward one another about their pivot axes 64, 66 to clamp the tray assembly 12 between the arm assemblies 36, 38 with the mounting tabs 30 in the slots 116 and to clamp the support arm 42 between the arm assemblies 36, 38 with its locking tabs 202 in the apertures 204. It is noted that the tab/slot connection between the tray assembly 12 and the frame assembly 14 creates an interconnection which prevents relative movement therebetween in directions other than the lateral direction of the clamping action or force, that is, in the forward-rearward direction and the vertical direction (as viewed when the wheelbarrow legs are resting on the ground).

With the wheelbarrow 10 in the working configuration, the user can place materials into the tray 16 and move them by lifting the handles 142 to raise the legs 96, 130 off of the ground and pushing so that the wheel 34 rolls along the ground. To dump the contents of the tray 16, the user can raise the rear end of the wheelbarrow 10 by working their hands around the J-shaped handles 142 until the wheelbarrow 10 is supported on the front bumper 46. The contents are released by making any necessary tipping and shaking motions. It is noted that the wheelbarrow 10 can be tipped forward in this manner without releasing a grip from the handles 142 due to the J-shaped handles. With the contents removed, the user then lowers the wheelbarrow 10 to back to rest on the wheel 34 rather than the bumper 46.

To store the wheelbarrow 10, the upper arm assemblies 86, 88 can be moved to their retracted positions and the tray assembly 12 left attached to the frame assembly 14. In this intermediate configuration, items can still be stored in the tray 16. To store the wheelbarrow 10 in the storage configuration, drive screw 172 is turned to loosen the clamping device 40. With the cable 180 loosened, the tray 16 can be slid rearwardly until the mounting tabs 30 are out of the slots 116 and then lifted off of the frame assembly 14. The locking tabs 202 of the support arm 42 are then removed from the apertures 204 and the support arm 42 is pivoted to and retained in the retaining bracket 206. The user then pivots each of the arm assemblies 36, 38 inwardly toward the central longitudinal axis 68 of the frame assembly 14. In this storage configuration, the frame assembly 14 and the tray assembly 12 can be separately stored as desired.

Figure 16:
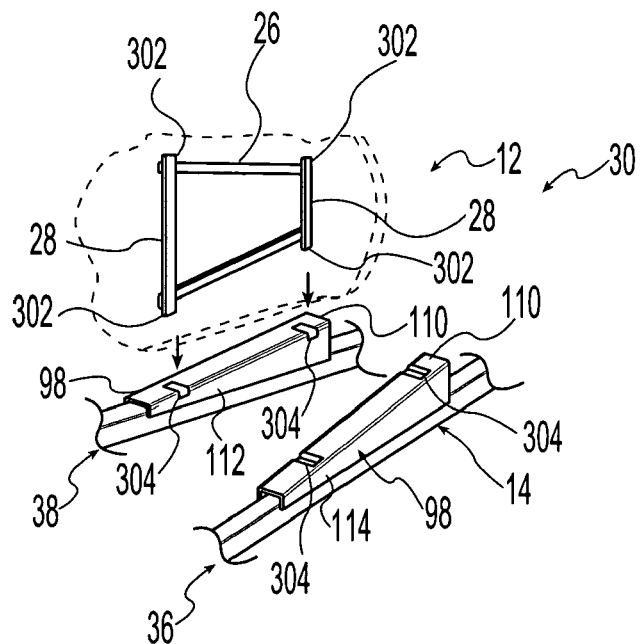
FIG. 16 is a fragmented perspective view of a wheelbarrow according to an alternative preferred embodiment of the present invention having bar/groove interface between the tray assembly and the frame assembly.
Figure 17:
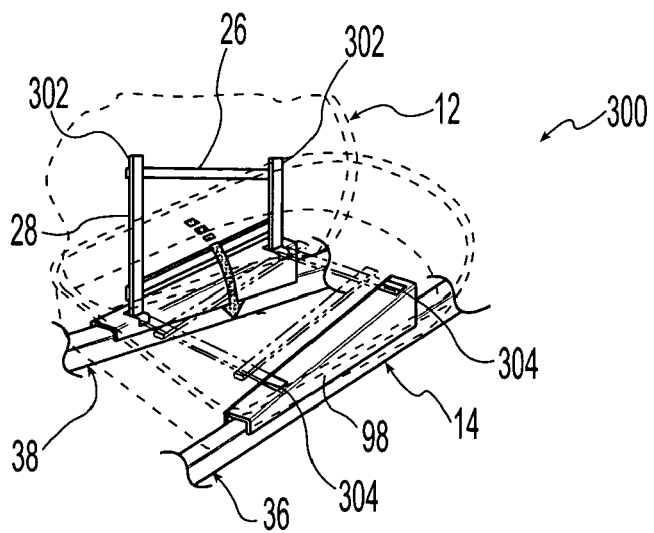
FIG. 17 is a fragmented perspective view of the wheelbarrow of FIG. 16 with the tray assembly secured to the frame assembly.

FIGS. 16 and 17 illustrate a wheelbarrow 300 according to a second preferred embodiment of the present invention. The wheelbarrow 300 of this embodiment is substantially the same as the wheelbarrow 10 of the first embodiment described in detail hereinabove except that the tab/slot connection between the tray assembly 12 and the frame assembly 14 is replaced by a rail/groove connection. This embodiment illustrates that various forms of interconnections can be utilized between the tray assembly 12 and the frame assembly 14 within the scope of the present invention.

As best shown in FIG. 16, the illustrated attachment bracket 18 includes a pair of laterally spaced apart arms 26. The illustrated arms 26 are secured together by a pair of longitudinally spaced apart connecting members 28. The illustrated arms and members 26, 28 are generally elongate and rectangular but any other suitable shape can be utilized. The illustrated arms and members 26, 28 are separately formed of a metal such as steel and then welded together but alternatively can be formed of any other suitable material, secured together by any other suitable method, and/or formed as a unitary component. Each end of the connecting members 28 form rails or bars 302 which extend laterally outward. Each lateral side of the attachment bracket 18 has a pair of parallel and longitudinally spaced apart pair of the rails 302. The rails 302 are sized and shaped to cooperate with the frame assembly 14 to removably secure the tray assembly 12 to the frame assembly 14 as described in more detail hereinafter. The illustrated rails are substantially rectangular or square shaped in cross-section but other suitable shapes can be utilized. The illustrated rails 302 are formed unitary with the connecting members 28 but alternatively can be separate components secured thereto or to the arms 26.

The right and left tray brackets 98 are sized and shaped to cooperate with the tray assembly 12 to releasably secure the tray 16 to the frame assembly 14. The illustrated tray brackets 98 have an elongate upper wall 110 sized and shaped for supporting the tray 16, and inner and outer walls 112, 114 downwardly extending form lateral inner and outer edges of the upper wall 110. The upper and inner walls 110, 112 are provided with a pair of longitudinally spaced apart openings which form grooves or channels 304 (FIG. 3) sized and shaped for receiving the pair of the rails 302 of the tray assembly 12. The grooves 304 are preferably sized to closely receive the rails 302 to limit forward/rearward movement of the tray assembly 12 relative to the tray bracket 98 when the rails 302 are within the grooves 304.

To place the wheelbarrow 300 in the working configuration, the user vertically orients the tray assembly 12 so that a pair of the rails 302 are facing downward and lowers the rails 302 into the grooves of one of the tray brackets 98. The tray 16 is then downwardly rotated about the inserted rails 302 until the other pair of the rails 302 enters the other pair of grooves 304 in the other tray bracket 98. The drive screw 172 (FIG. 15) is then turned to tension the cable 180 and pull the arm assemblies 36, 38 toward one another about their pivot axes 64, 66 to clamp the tray assembly 12 between the arm assemblies 36, 38 with the rails 302 in the grooves 304. It is noted that the rail/groove connection between the tray assembly 12 and the frame assembly 14 preferably creates an interconnection or obstruction which prevents relative movement there between in directions other than the direction of the clamping action, that is, in the forward-rearward direction and the vertical direction (as viewed when the wheelbarrow legs are resting on the ground). The interconnection or obstruction in the vertical direction is formed when the rails 302 extend below the upper walls when the arm assemblies 36, 38 are pivoted laterally inward.

Figure 18:
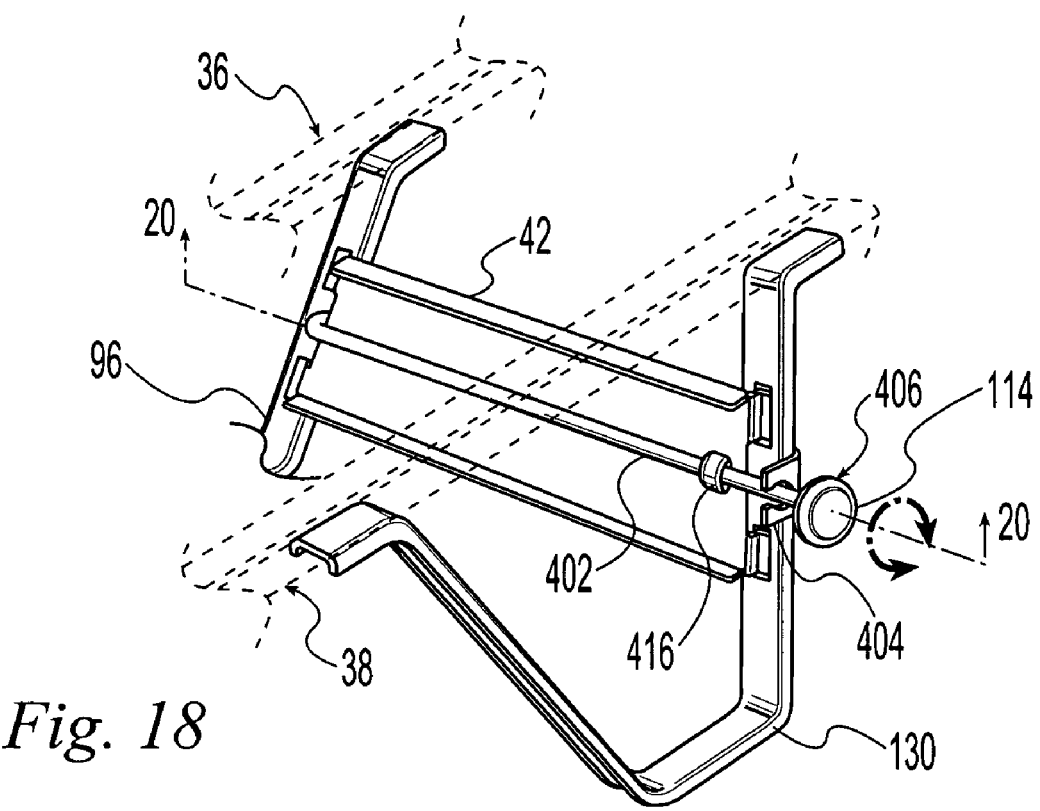
FIG. 18 is a fragmented perspective view of a wheelbarrow according to another alternative preferred embodiment of the present invention having a clamping mechanism including a tension rod.
Figure 19:
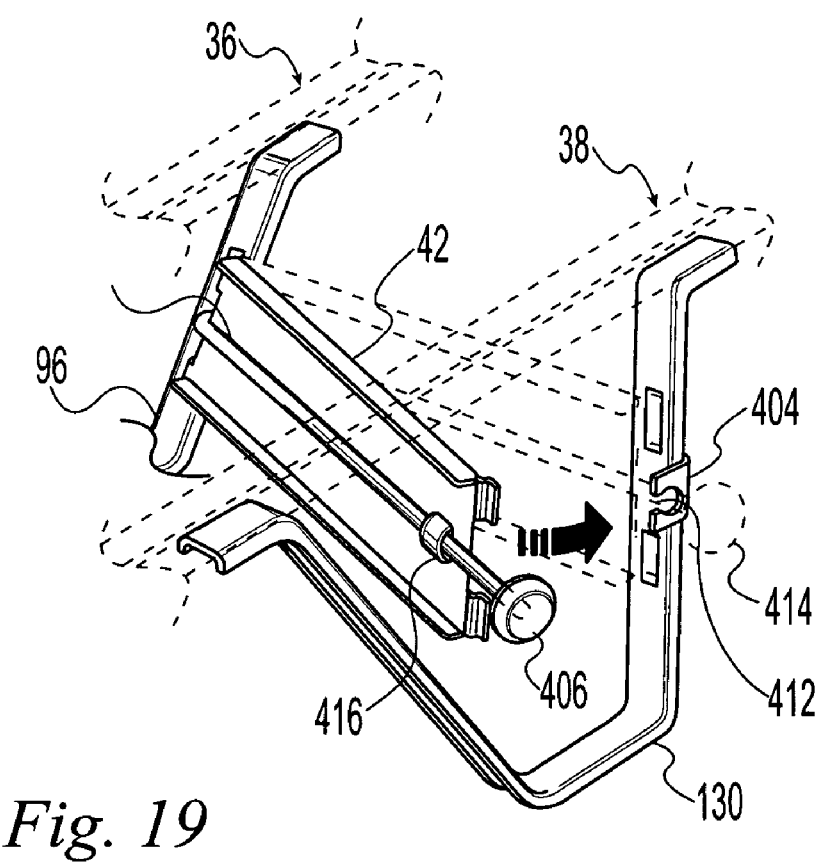
FIG. 19 is a fragmented perspective view similar to FIG. 17 but showing the brace in a pivoted and disengaged position.
Figure 20:
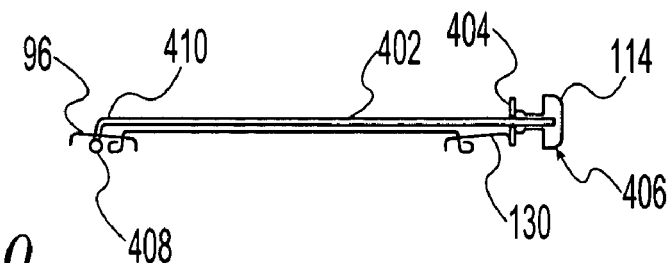
FIG. 20 is cross-sectional view taken along line 20-20 of FIG. 18.

FIGS. 18 to 20 illustrate a wheelbarrow 400 according to a third preferred embodiment of the present invention. The wheelbarrow 400 of the third embodiment is substantially the same as the wheelbarrow 10 of the first embodiment described in detail hereinabove except that the clamping device 40 is in the form of a rigid tension rod instead of a flexible cable. This embodiment illustrates that various forms of the clamping device 40 can be utilized to provide a tension force pulling the arm assemblies 36, 38 together to clamp the tray assembly 12 within the scope of the present invention.

The illustrated clamping device 40 includes tension rod 402, a tension bracket 404, and a drive nut 406. The illustrated tension rod 402 is generally elongate having a circular-cross-section. The first end of the tension rod 402 is pivotably mounted to the right leg 96. It is noted that tension rod 402 is pivotally mounted to the same one of the legs 96, 130 as the support arm 42. This embodiment illustrates that the support arm 42 can be pivotably mounted to either leg 96, 130. The illustrated first end of the tension rod 402 is provided with an enlarged end 408 which is inserted through a key-shaped opening 410 in the right leg 96 located between the apertures 198 in the right leg 96 for the support arm 42. The second end of the tension rod 402 is threaded to cooperate with the drive nut 406 as described in more detail hereinafter. The tension rod 402 is formed of a suitable rigid material such as, for example, steel. The illustrated tension bracket 404 is located on the left leg 130 and is sized and shaped for receiving the second end of the tension rod 402. The tension bracket 404 has a horizontally extending slot 412 with an open forward end so that as the tension rod 402 pivots toward the left lower leg 130, the second end of the tension rod 402 is received in the slot 412. The drive nut 406 has a threaded opening which cooperates with the threaded second end of the tension rod 402 and engages the outer surface of the tension bracket 404 to tension the tension rod 402 and clamp the tray assembly 12 and the support arm 42 between the arm assemblies 36, 38 when the drive nut 306 is rotated. The illustrated drive nut 406 has a handle portion 414 so that the drive nut 496 can be manually rotated by hand without tools. The illustrated support arm 42 is provided with a support 416 for securing the tension rod 402 to the support arm 42 for pivoting therewith. The support 416 is sized and shaped to permit longitudinal motion of the tension rod 402 relative to the support arm 42 but limit pivoting motion relative thereto.

Figure 21:
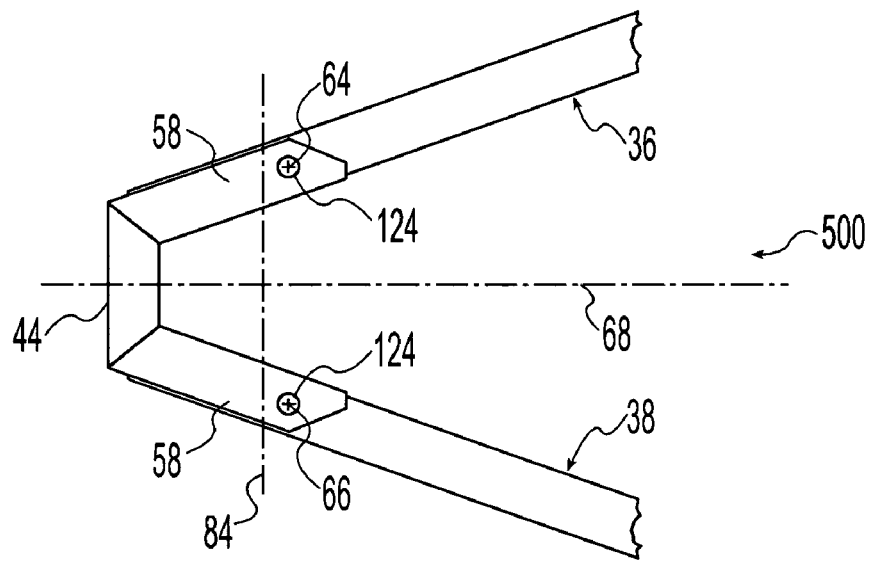
FIG. 21 is a fragmented top elevational view of a wheelbarrow according to another alternative preferred embodiment of the present invention wherein the lower arm assemblies pivot about an axis located rearward of a wheel axle.
Figure 22:
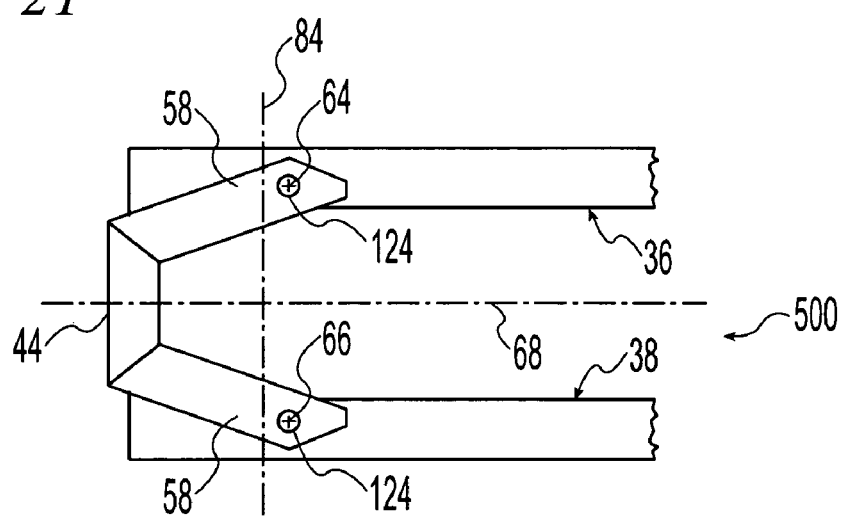
FIG. 22 is a fragmented top elevational view of the wheelbarrow of FIG. 21 but with the frame assembly in the shipping or storing configuration.

FIGS. 21 and 22 illustrate a wheelbarrow 500 according to a fourth preferred embodiment of the present invention. The wheelbarrow 500 of this embodiment is substantially the same as the wheelbarrow 10 of the first embodiment described in detail hereinabove except that the pivot axes 64, 66 of the lower arm assemblies 36, 38 are located rearward of the rotational axis 84 of the wheel 34. This embodiment illustrates that various forms of connections between the arm assemblies 36, 38 and the front bracket 44 can be utilized within the scope of the present invention.

The illustrated front bracket 44 includes leg sections having vertically spaced apart planar upper and lower walls or plates 58, 60. The leg sections are sized and shaped to receive the arm assembles 36, 38 between the upper and lower walls 58, 60. Coaxial openings 62 are formed in the upper and lower walls 58, 60 of each of the leg sections to form the parallel and laterally spaced-apart pivot axes 64, 66 for the arm assemblies 36, 38. The illustrated pivot axes 64, 66 are located near the rearward end of the leg sections rearward of the rotational axis of the wheel 84 and are substantially perpendicular to a central longitudinal axis 68 of the wheelbarrow 10.

With the forward ends of the lower arms 94, 128 extending into the respective leg sections of the front bracket 44, the lower arms 94, 128 are pivotably secured to the front bracket 44. The illustrated lower arms 94, 128 are secured with fasteners 124. The illustrated fastener 124 is a bolt and nut but any other suitable fastening means can alternatively be utilized. Pivotably secured in this manner, the lower arms 94, 128 can pivot inwardly toward and outwardly away from the central longitudinal axis 68 of the wheelbarrow 10. It is noted that the lower arms 94 extends forwardly past the rotational axis 84 of the wheel 34 so that they substantially extend the full length of the leg sections between the upper and lower walls 58, 60. Mounted in this manner, the arm assemblies 36, 38 provide support to the front bracket 44 during dumping operations even though they pivot rearward of the rotational axis 84 of the wheel 34.

Figure 23:
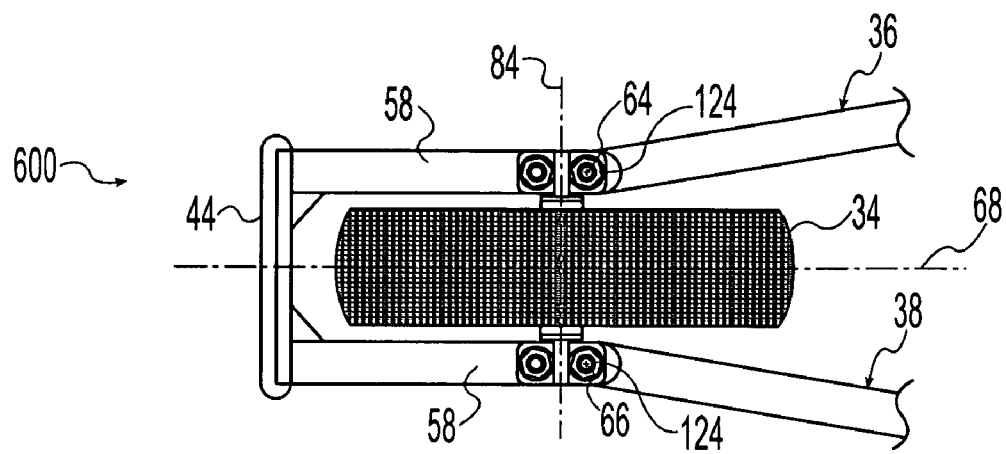
FIG. 23 is a fragmented top elevational view of a wheelbarrow according to another alternative preferred embodiment of the present invention, wherein the lower arm assemblies do not extend beyond the wheel axle.
Figure 24:
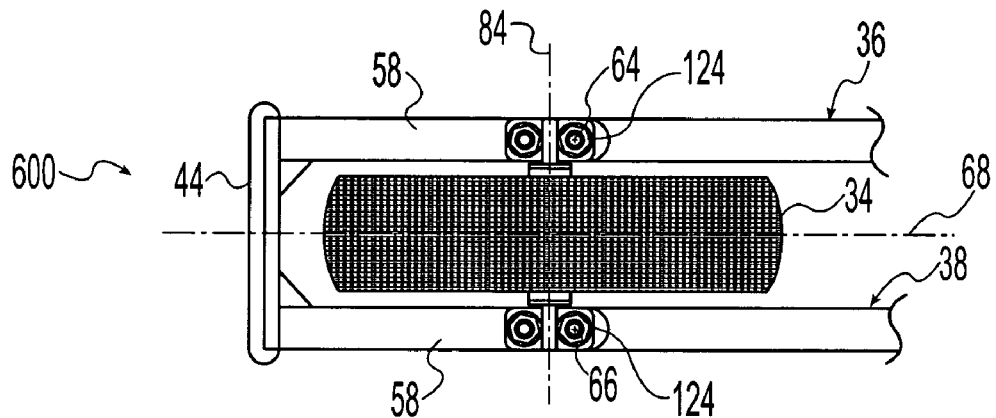
FIG. 24 a fragmented top elevational view of the wheelbarrow of FIG. 23 but with the frame assembly in the shipping or storing configuration.
Figure 25:
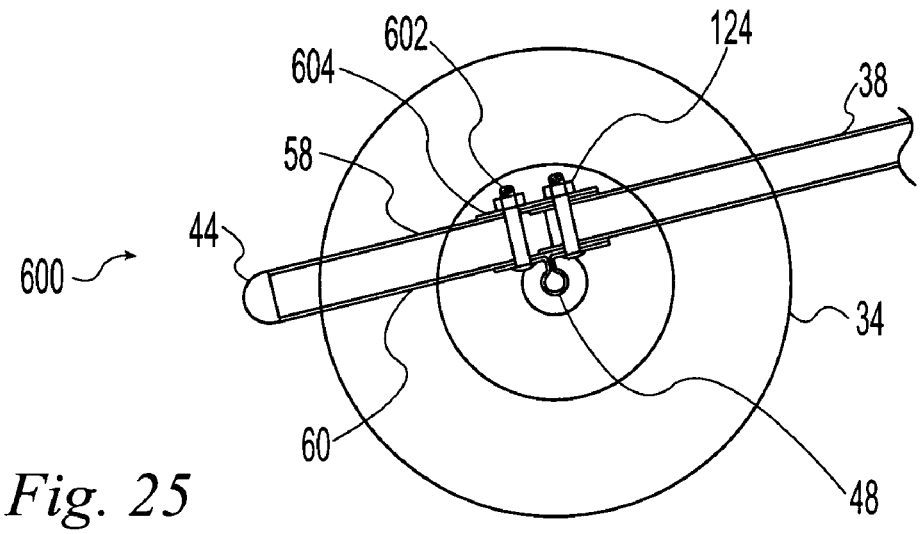
FIG. 25 is a fragmented left side elevational view of the wheelbarrow of FIGS. 23 and 24.

FIGS. 23 to 25 illustrate a wheelbarrow 600 according to a fifth preferred embodiment of the present invention. This embodiment is substantially the same as the wheelbarrow 500 of the fourth embodiment described hereinabove except that the arm assemblies 36, 38 only extend to a location near the rotational axis 84 of the wheel 34. This embodiment further illustrates that various forms of connections between the arm assemblies 36, 38 and the front bracket 44 can be utilized within the scope of the present invention.

With the forward ends of the lower arms 94, 128 extending into the respective leg sections of the front bracket 44, the lower arms 94, 128 are pivotably secured to the front bracket 44. The illustrated lower arms 94, 128 are secured with fasteners 124. Each illustrated fastener 124 is a bolt and nut but any other suitable fastening means can alternatively be utilized. Pivotably secured in this manner, the lower arms 94, 128 can pivot inwardly toward and outwardly away from the central longitudinal axis 68 of the wheelbarrow 10. It is noted that the lower arms 94, 128 do not extend forwardly past the rotational axis 84 of the wheel 34. Therefore, the lower arms 94, 128 extend for less than half of the longitudinal length of the leg sections of the front bracket 44. The front bracket 44 is preferably provided with additional support. The illustrated arm sections are additionally secured with fasteners 602 located forward of the rotational axis 84 of the wheel 34. The additional fasteners 602 are longitudinally spaced forward of the pivot fasteners 124. The illustrated additional fasteners 602 are each a bolt and nut but any other suitable fastening means can alternatively be utilized. In the illustrated embodiment, the axle supports 48 and an upper stiffening plate 604 are provided and secured by the fasteners 124, 602.

It is noted that each of the features of the various illustrated embodiments of the present invention can be used in any combination with the features of the other illustrated embodiments.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A wheelbarrow comprising, in combination:
    a rigid front bracket;
    a wheel rotatably secured to the front bracket and rotatable about a horizontally, laterally extending axis of rotation;
    first and second handle arms pivotably attached to the front bracket;
    a rigid tray; and
    a clamping device extending between the first and second handle arms and removably applying a laterally-extending clamping force between the first and second handle arms to move the first and second handle arms relative to one another in a lateral direction and clamp the tray between the first and second handle arms.

2. The wheelbarrow according to claim 1, wherein the clamping device includes a flexible cable extending between the first and second handle arms.

3. The wheelbarrow according to claim 1, wherein the clamping device includes a rigid rod extending between the first and second handle arms.

4. The wheelbarrow according to claim 1, wherein the tray is interconnected with the first and second handle arms to permit relative movement therebetween in a lateral direction and to prevent relative movement therebetween in each direction other than the lateral direction.

5. The wheelbarrow according to claim 1, wherein the first and second handle arms are laterally pivotable about the first and second spaced apart pivot axes respectively and the first and second pivot axes are laterally spaced apart.

6. The wheelbarrow according to claim 1, wherein the first and second handle arms each include telescoping upper and lower arms so that the upper arms are selectively movable between extended and retracted positions.

7. The wheelbarrow according to claim 1, wherein the front bracket is generally U-shaped having a laterally extending front section and first and second laterally spaced apart leg sections rearwardly extending from the front section and the first and second handle arms are pivotably attached to the front bracket at the first and second leg sections respectively.

8. The wheelbarrow according to claim 1, wherein the clamping force is adjustable.

9. The wheelbarrow according to claim 1, wherein the laterally-extending clamping force is applied in a direction substantially parallel to the axis of rotation of the wheel.

10. The wheelbarrow according to claim 1, wherein the clamping force pulls the first and second handle arms toward one another to clamp the tray between the first and second handle arms.

11. The wheelbarrow according to claim 1, wherein the clamping device includes a tension member laterally extending between the first and second handle arms and having an adjustable length to selectively apply a tension force between the first and second handle arms and clamp the tray between the first and second handle arms.

12. The wheelbarrow according to claim 11, wherein the tension member includes a flexible cable extending between the first and second handle arms in a lateral direction substantially parallel to the axis of rotation of the wheel.

13. The wheelbarrow according to claim 11, wherein the clamping device includes a rotatable handle that increases and decreases the effective length of the tension member depending on the direction of rotation.

14. A wheelbarrow comprising, in combination:
    a rigid front bracket;
    a wheel rotatably secured to the front bracket and rotatable about a horizontally, laterally extending axis of rotation;
    first and second handle arms pivotably attached to the front bracket;
    a rigid tray removably secured to first and second handle arms;
    wherein the tray is interconnected with the first and second handle arms to permit relative movement therebetween in a lateral direction and to prevent relative movement therebetween in a forward-rearward direction; and
    a clamping device extending between the first and second handle arms and removably applying a laterally-extending clamping force between the first and second handle arms to move the first and second handle arms relative to one another in a lateral direction and clamp the tray between the first and second handle arms.

15. The wheelbarrow according to claim 14, wherein the tray is interconnected with the first and second handle arms to permit relative movement therebetween in a lateral direction and to prevent relative movement therebetween in each direction other than the lateral direction.

16. The wheelbarrow according to claim 14, wherein the tray has tabs extending laterally outward and the first and second handle arms have slots receiving the tabs.

17. The wheelbarrow according to claim 14, wherein the tray has rails extending laterally outward and the first and second handle arms have grooves receiving the rails.

18. The wheelbarrow according to claim 14, wherein the first and second handle arms are laterally pivotable about the first and second spaced apart pivot axes respectively and the first and second pivot axes are laterally spaced apart.

19. The wheelbarrow according to claim 14, wherein the first and second handle arms each include telescoping upper and lower arms so that the upper arms are selectively movable between extended and retracted positions.

20. The wheelbarrow according to claim 14, wherein the front bracket is generally U-shaped having a laterally extending front section and first and second laterally spaced apart leg sections rearwardly extending from the front section and the first and second handle arms are pivotably attached to the front bracket at the first and second leg sections respectively.

21. The wheelbarrow according to claim 14, wherein the clamping force is adjustable.

22. The wheelbarrow according to claim 14, wherein the laterally-extending clamping force is applied in a direction substantially parallel to the axis of rotation of the wheel.

23. The wheelbarrow according to claim 14, wherein the clamping force pulls the first and second handle arms toward one another to clamp the tray between the first and second handle arms.

24. The wheelbarrow according to claim 14, wherein the clamping device includes a tension member laterally extending between the first and second handle arms and having an adjustable length to selectively apply a tension force between the first and second handle arms and clamp the tray between the first and second handle arms.

25. The wheelbarrow according to claim 24, wherein the tension member includes a flexible cable extending between the first and second handle arms in a lateral direction substantially parallel to the axis of rotation of the wheel.

26. The wheelbarrow according to claim 24, wherein the clamping device includes a rotatable handle that increases and decreases the effective length of the tension member depending on the direction of rotation.

* * * * *

UNITED STATES PATENT AND TRADEMARK OFFICE
CERTIFICATE OF CORRECTION

| | |
|---|---|
| PATENT NO. | : 7,866,686 B2 |
| APPLICATION NO. | : 10/805685 |
| DATED | : January 11, 2011 |
| INVENTOR(S) | : Brian J. Conaway et al. |

It is certified that error appears in the above-identified patent and that said Letters Patent is hereby corrected as shown below:

Title page, second column, ABSTRACT, line 12, "forward rearward" should read --forward-rearward--.
Column 1, line 57, "in used" should read --if used--.
Column 2, line 23, "combination a" should read --combination, a--.
Column 2, line 55, "ther-" should read --there--.
Column 2, line 56, "ebetween" should read --between--.
Column 2, line 56, "forward rearward" should read --forward-rearward--.
Column 2, line 58, "embodiments it" should read --embodiments, it--.
Column 3, line 19, "an-top-right-rear" should read --a-top-right-rear--.
Column 3, line 52, "is cross-sectional" should read --is a cross-sectional--.
Column 4, line 57, "The Illustrated" should read --The illustrated--.
Column 5, line 53, "pair axle supports" should read --pair of axle supports--.
Column 5, line 66, "upper and low walls" should read --upper and lower walls--.
Column 6, line 7, "herein after" should read --hereinafter--.
Column 6, line 20, "herein after" should read --hereinafter--.
Column 6, line 32, "are provide" should read --are provided--.
Column 7, line 27, "extending form" should read --extending from--.
Column 8, line 34, "preferably and sized" should read --preferably sized--.
Column 11, line 64, "off of" should read --off--.
Column 12, line 7, "to back to rest" should read --back to rest--.
Column 12, line 17, "off of" should read --off--.
Column 12, line 62, "extending form lateral" should read --extending from lateral--.
Column 13, line 17, "there" should read --there- --.

Signed and Sealed this
Tenth Day of July, 2012

David J. Kappos
*Director of the United States Patent and Trademark Office*